(12) United States Patent
Nohara et al.

(10) Patent No.: US 12,365,165 B2
(45) Date of Patent: *Jul. 22, 2025

(54) INTERMEDIATE FILM FOR LAMINATED GLASSES, AND LAMINATED GLASS

(71) Applicant: SEKISUI CHEMICAL CO., LTD., Osaka (JP)

(72) Inventors: Atsushi Nohara, Shiga (JP); Kinryou Chou, Shiga (JP); Kazuhiko Nakayama, Shiga (JP); Moyuru Okajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,531

(22) Filed: Jun. 10, 2024

(65) Prior Publication Data

US 2024/0326388 A1    Oct. 3, 2024

Related U.S. Application Data

(63) Continuation of application No. 18/009,871, filed as application No. PCT/JP2021/023796 on Jun. 23, 2021, now Pat. No. 12,053,955.

(30) Foreign Application Priority Data

Jun. 26, 2020    (JP) .................................. 2020-110501

(51) Int. Cl.
    *B32B 7/12*          (2006.01)
    *B32B 17/10*       (2006.01)

(52) U.S. Cl.
    CPC .......... *B32B 17/10651* (2013.01); *B32B 7/12* (2013.01); *B32B 17/10073* (2013.01);
         (Continued)

(58) Field of Classification Search
    CPC ................ B32B 7/12; B32B 17/10036; B32B 17/10651; B32B 17/10614;
         (Continued)

(56) References Cited

U.S. PATENT DOCUMENTS

2004/0234778 A1    11/2004   Fukatani et al.
2013/0280540 A1    10/2013   Amano et al.
         (Continued)

FOREIGN PATENT DOCUMENTS

CN           103347834       10/2013
CN           103459346       12/2013
         (Continued)

OTHER PUBLICATIONS

International Search Report (ISR) issued Aug. 31, 2021 in International (PCT) Application No. PCT/JP2021/023796.

(Continued)

*Primary Examiner* — Elizabeth E Mulvaney
(74) *Attorney, Agent, or Firm* — WENDEROTH, LIND & PONACK, L.L.P.

(57) ABSTRACT

Provided is an interlayer film for laminated glass capable of making bluish fogging less likely to occur. An interlayer film for laminated glass according to the present invention contains a pigment, and in the interlayer film for laminated glass, a value YId obtained by subtracting a yellow index YIp calculated from parallel light transmittance from a yellow index YIt calculated from total light transmittance is −1.0 or more.

19 Claims, 2 Drawing Sheets

(52) U.S. Cl.
CPC .... *B32B 17/10614* (2013.01); *B32B 2250/03* (2013.01); *B32B 2250/40* (2013.01); *B32B 2307/306* (2013.01); *B32B 2307/4026* (2013.01); *B32B 2605/00* (2013.01)

(58) Field of Classification Search
CPC ........ B32B 17/10633; B32B 17/10678; B32B 17/10642; B32B 17/10807
See application file for complete search history.

(56) References Cited

U.S. PATENT DOCUMENTS

| | | | |
|---|---|---|---|
| 2013/0323515 | A1 | 12/2013 | Okabayashi et al. |
| 2015/0168618 | A1 | 6/2015 | Nakajima |
| 2017/0363788 | A1 | 12/2017 | Fukuda et al. |
| 2019/0002708 | A1 | 1/2019 | Tsunematsu et al. |
| 2019/0369313 | A1 | 12/2019 | Fukuda et al. |
| 2020/0270401 | A1 | 8/2020 | Kobayashi et al. |
| 2024/0408854 | A1* | 12/2024 | Takai ................ B32B 17/10036 |

FOREIGN PATENT DOCUMENTS

| | | |
|---|---|---|
| EP | 3 647 388 | 5/2020 |
| JP | 2014-141376 | 8/2014 |
| JP | 2016-135873 | 7/2016 |
| JP | 2017-226833 | 12/2017 |
| JP | 2018-199758 | 12/2018 |
| JP | 2019-119635 | 7/2019 |
| TW | 570871 | 1/2004 |
| WO | 2013/179902 | 12/2013 |
| WO | 2017/104854 | 6/2017 |
| WO | 2020/230690 | 11/2020 |

OTHER PUBLICATIONS

International Preliminary Report on Patentability issued Dec. 13, 2022 in International (PCT) Application No. PCT/JP2021/023796.
Extended European Search Report issued Jun. 18, 2024 in corresponding European Patent Application No. 21828637.5.

* cited by examiner

[FIG. 1.]
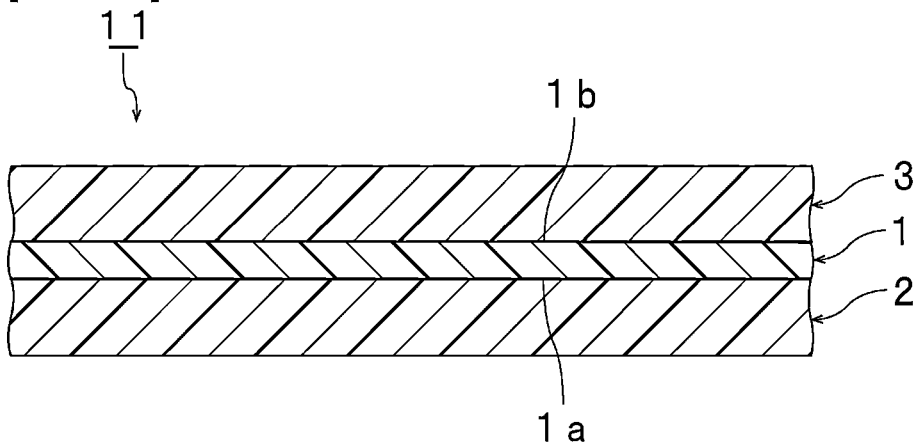
[FIG. 2.]
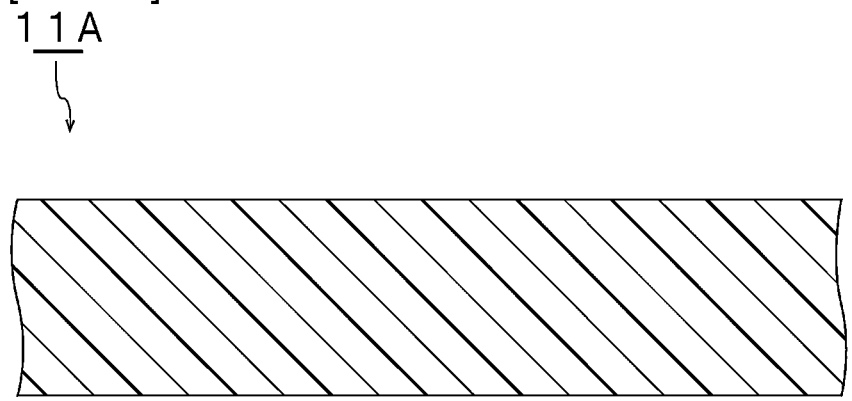
[FIG. 3.]
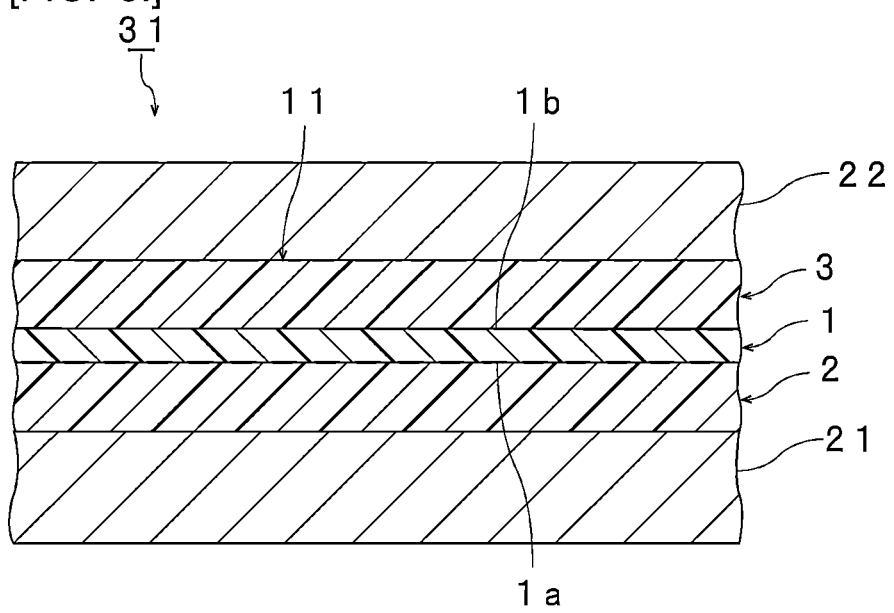

[FIG. 4.]
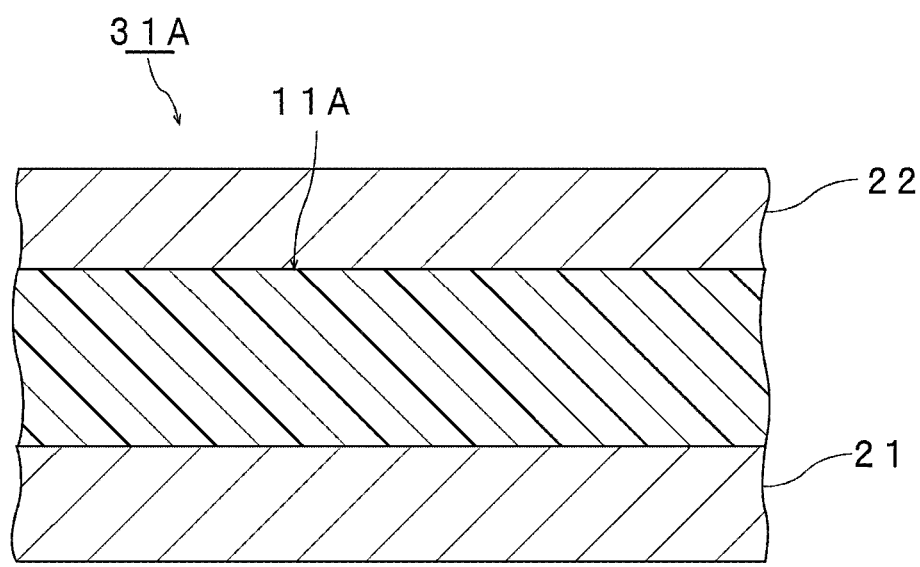

INTERMEDIATE FILM FOR LAMINATED GLASSES, AND LAMINATED GLASS

TECHNICAL FIELD

Cross-Reference to Related Applications

This application is based on and claims the benefit of priorities from U.S. patent application Ser. No. 18/009,871 (filed on Dec. 12, 2022), and Japanese Patent Application Serial No. 2020-110501 (filed on Jun. 26, 2020), the contents of which are hereby incorporated by reference in their entirety.

The present invention relates to an interlayer film for laminated glass that is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates.

The following Patent Document 1 discloses an infrared shield wherein at which the reflectance peaks falls within the range between 850 nm and 1500 nm in the reflection spectrum of wavelengths of 400 nm to 2500 nm. In the infrared shield, a first reflecting film, an optically non-interfering layer, and a second reflecting film are laminated in this order, and the first reflecting film and the second reflecting film contain polymer and metal-containing particles. Patent Document 1 indicates that the infrared shield is used as an interlayer film for laminated glass.

RELATED ART DOCUMENT

Patent Document

Patent Document 1: WO 2013/179902 A1

SUMMARY OF THE INVENTION

Problems to be Solved by the Invention

In order to enhance the heat shielding property of the interlayer film or impart color tone to the interlayer film, an interlayer film containing a pigment is sometimes used.

However, in a conventional interlayer film containing a pigment, bluish fogging (also referred to as blue haze) can occur. For example, in a conventional interlayer film containing a pigment, bluish fogging can occur when the interlayer film is irradiated with sunlight, light of a vehicle, and light of an illuminator and the like.

It is an object of the present invention to provide an interlayer film for laminated glass capable of making bluish fogging less likely to occur. It is also an object of the present invention to provide a laminated glass prepared with the interlayer film for laminated glass.

Means for Solving the Problems

According to a broad aspect of the present invention, there is provided an interlayer film for laminated glass (hereinafter, sometimes described as interlayer film) containing a pigment, in the interlayer film for laminated glass, a value YId obtained by subtracting a yellow index YIp calculated from parallel light transmittance from a yellow index YIt calculated from total light transmittance being −1.0 or more.

In a specific aspect of the interlayer film according to the present invention, the pigment has an average aspect ratio of 4.0 or less.

In a specific aspect of the interlayer film according to the present invention, the pigment is a heat shielding pigment.

In a specific aspect of the interlayer film according to the present invention, the pigment is an inorganic pigment.

In a specific aspect of the interlayer film according to the present invention, the inorganic pigment is tin-doped indium oxide particles or cesium-doped tungsten oxide particles.

In a specific aspect of the interlayer film according to the present invention, the pigment is a coloring pigment.

In a specific aspect of the interlayer film according to the present invention, the coloring pigment is an azo compound, a condensed polycyclic compound, carbon black, or graphene.

In a specific aspect of the interlayer film according to the present invention, the interlayer film contains a thermoplastic resin.

In a specific aspect of the interlayer film according to the present invention, the interlayer film contains a dispersing agent.

In a specific aspect of the interlayer film according to the present invention, the dispersing agent includes a phosphoric acid ester or a diketone compound.

In a specific aspect of the interlayer film according to the present invention, the interlayer film contains an adhesive force adjusting agent.

In a specific aspect of the interlayer film according to the present invention, the adhesive force adjusting agent is an alkali metal salt of carboxylic acid, or an alkali earth metal salt of carboxylic acid.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass including a first lamination glass member, a second lamination glass member, and an interlayer film for laminated glass, the interlayer film for laminated glass being arranged between the first lamination glass member and the second lamination glass member, the interlayer film for laminated glass containing a pigment, in the laminated glass, a value YId obtained by subtracting a yellow index YIp calculated from parallel light transmittance from a yellow index YIt calculated from total light transmittance being −1.0 or more.

Effect of the Invention

The interlayer film according to the present invention contains a pigment. In the interlayer film according to the present invention, a value YId obtained by subtracting a yellow index YIp calculated from parallel light transmittance from a yellow index YIt calculated from total light transmittance is −1.0 or more. In the interlayer film according to the present invention, since the above-described configuration is provided, it is possible to make bluish fogging less likely to occur.

The laminated glass according to the present invention includes a first lamination glass member, a second lamination glass member, and an interlayer film for laminated glass. In the laminated glass according to the present invention, the above-mentioned interlayer film for laminated glass is arranged between the first lamination glass member and the second lamination glass member. In the laminated glass according to the present invention, the interlayer film for laminated glass contains a pigment. In the laminated glass according to the present invention, a value YId obtained by subtracting a yellow index YIp calculated from parallel light transmittance from a yellow index YIt calculated from total light transmittance is -1.0 or more. In the laminated glass according to the present invention, since the above-described configuration is provided, it is possible to make bluish fogging less likely to occur.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODES FOR CARRYING OUT THE INVENTION

Hereinafter, the present invention will be described in detail.
(Interlayer Film for Laminated Glass)

The interlayer film for laminated glass (in the present specification, sometimes abbreviated as "interlayer film") according to the present invention is used for laminated glass.

The interlayer film according to the present invention has a one-layer structure or a two or more-layer structure. The interlayer film according to the present invention may have a one-layer structure and may have a two or more-layer structure. The interlayer film according to the present invention may have a two-layer structure, may have a two or more-layer structure, may have a three-layer structure, and may have a three or more-layer structure. The interlayer film according to the present invention may include only a first layer. The interlayer film according to the present invention may include, a first layer, and a second layer arranged on a first surface side of the first layer. The interlayer film according to the present invention may include a first layer, a second layer arranged on a first surface side of the first layer, and a third layer arranged on a second surface side opposite to the first surface of the first layer. The interlayer film according to the present invention may be a single-layered interlayer film or may be a multi-layered interlayer film. The structure of the interlayer film according to the present invention may partially vary. For example, the interlayer film according to the present invention may have a part having a one-layer structure, and a part having a multi-layer structure.

The interlayer film according to the present invention contains a pigment. In the interlayer film according to the present invention, a value YId obtained by subtracting a yellow index YIp calculated from parallel light transmittance from a yellow index YIt calculated from total light transmittance is -1.0 or more. The value YId is a value calculated by the formula: YId=YIt-YIp. In other words, the interlayer film according to the present invention satisfies the formula: YIt-YIp≥-1.0. The interlayer film according to the present invention satisfies the formula: YId≥-1.0.

In the interlayer film according to the present invention, since the above-described configuration is provided, it is possible to make bluish fogging less likely to occur. In the interlayer film according to the present invention, it is possible to make bluish fogging less likely to occur although a pigment is contained.

The yellow index YIt and the yellow index YIp in the interlayer film according to the present invention are calculated by measuring a total light transmittance and a parallel light transmittance of a laminated glass X after obtaining the laminated glass X by arranging the above-described interlayer film between two lamination glass members. The laminated glass X is prepared for calculating the yellow index YIt and the yellow index YIp. The total light transmittance and the parallel light transmittance are measured using the same laminated glass X. The yellow index YIt and the yellow index YIp in the interlayer film according to the present invention can be measured by using the laminated glass X. The yellow index YIt and the yellow index YIp in the laminated glass X are defined as the yellow index YIt and the yellow index YIp in the interlayer film according to the present invention.

The method for preparing the laminated glass X is not particularly limited. One example of the method for preparing the laminated glass X is shown below.

The interlayer film is sandwiched between two lamination glass members to obtain a laminate. The obtained laminate is put into a rubber bag and the inside thereof is degassed for 20 minutes with a degree of vacuum of 2.6 kPa, after which the laminate in the degassed condition is transferred into an oven, and vacuum-pressed by retention at 90° C. for 30 minutes, and thus the laminate is preliminarily press-bonded. The preliminarily press-bonded laminate is subjected to press-bonding for 20 minutes under conditions of 135° C. and a pressure of 1.2 MPa in an autoclave to obtain the laminated glass X. In the laminated glass X for measuring the yellow index YIt and the yellow index YIp, a clear glass having a thickness of 2.5 mm, conforming to JIS R3202:1996 is used as the lamination glass member.

In preparation of a laminated glass product using the interlayer film according to the present invention, a clear glass having a thickness of 2.5 mm conforming to JIS R3202:1996 may be used, and a clear glass other than the clear glass having a thickness of 2.5 mm conforming to JIS R3202:1996 may be used, and a lamination glass member other than clear glass may be used.

When a laminated glass product is obtained by using the interlayer film according to the present invention, it is preferred that the value YId obtained by subtracting the yellow index YIp calculated from parallel light transmittance from the yellow index YIt calculated from total light transmittance be -1.0 or more in the obtained laminated glass product. The total light transmittance and the parallel light transmittance of the obtained laminated glass product are measured using the laminated glass product in place of the laminated glass X in measurement of the total light transmittance and the parallel light transmittance of the laminated glass X.

The total light transmittance of the laminated glass X is measured in the following manner.

The laminated glass X is placed parallel with the normal line of the light axis on the optical path between the light source and the integrating sphere at a position where the laminated glass is in contact with the integrating sphere so that only the transmitted light is received by the integrating sphere with a spectrophotometer. The total light transmittance means a visible light transmittance calculated from the spectral transmittance measured in this condition.

The parallel light transmittance of the laminated glass X is measured in the following manner.

The laminated glass X is placed parallel with the normal line of the light axis on the optical path between the light source and the integrating sphere at a position 13 cm away from the integrating sphere so that only the transmitted parallel light is received by the integrating a sphere with spectrophotometer. The parallel light transmittance means a visible light transmittance calculated from the spectral transmittance measured in this condition.

Examples of the spectrophotometer for use in measuring the total light transmittance and the parallel light transmittance of the laminated glass X include "U-4100" available from Hitachi High-Tech Corporation. It is preferred that the total light transmittance and the parallel light transmittance of the laminated glass X be measured at the center position of the interlayer film for laminated glass.

The yellow index YIt and the yellow index YIp are calculated from the total light transmittance and the parallel light transmittance of the laminated glass X in accordance with JIS K7373.

The value YId is calculated by subtracting the yellow index YIp from the yellow index YIt.

The value YId in the interlayer film according to the present invention is −1.0 or more, preferably −0.9 or more, more preferably −0.8 or more, still more preferably −0.7 or more, further preferably −0.6 or more, still further preferably −0.5 or more, especially preferably −0.4 or more. When the value YId is the above lower limit or more, it is possible to make bluish fogging still less likely to occur. The value YId may be 10.0 or less, may be 9.0 or less, and may be 8.0 or less. The YId in the laminated glass product prepared with the interlayer film according to the present invention preferably satisfies the above-described lower limit, and may satisfy the above-described upper limit.

The value YId can be controlled, for example, by controlling the particle diameter of the pigment, or by controlling the aspect ratio of the pigment, or by controlling the dispersibility of the pigment.

Hereinafter, specific embodiments of the present invention will be described with reference to the drawings.

FIG. 1 is a sectional view schematically showing an interlayer film for laminated glass in accordance with a first embodiment of the present invention. In FIG. 1, a section in the thickness direction of an interlayer film 11 is shown.

The interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2, and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged between the second layer 2 and the first layer 1 and between the first layer 1 and the third layer 3, respectively. Examples of other layers include a layer containing polyethylene terephthalate and the like. It is preferred that the second layer 2 and the first layer 1, and the first layer 1 and the third layer 3 be directly layered, respectively.

FIG. 2 is a sectional view schematically showing an interlayer film for laminated glass in accordance with a second embodiment of the present invention. In FIG. 2, a section in the thickness direction of an interlayer film 11A is shown.

The interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

Hereinafter, the details of the first layer, the second layer and the third layer which constitute the interlayer film according to the present invention, and the details of each ingredient contained in the first layer, the second layer and the third layer will be described.

(Pigment)

The interlayer film contains a pigment. The first layer may contain or need not contain a pigment. The second layer may contain or need not contain a pigment. The third layer may contain or need not contain a pigment. One kind of the pigment may be used alone, and two or more kinds thereof may be used in combination.

In the present specification, pigment is defined as follows.

A polyvinyl butyral resin (the polymerization degree of polyvinyl alcohol of 1700, the content of the hydroxyl group of 30% by mole, the acetylation degree of 1% by mole, the butyralization degree of 69% by mole) is prepared. One hundred parts by weight of the polyvinyl butyral resin, 40 parts by weight of triethylene glycol di-2-ethylhexanoate (3GO), and a measuring object in a content of 0.015% by weight in 100% by weight of the total amount of the polyvinyl butyral resin, 3GO and the measuring object are kneaded and extruded to give a resin film (single layer, resin film for evaluation) having a thickness of 760 μm. The measuring object detected as particles when the obtained resin film is observed under an electron microscopy such as a transmission electron microscopy (TEM) is defined as a pigment.

The pigment may be an organic pigment or an inorganic pigment, and may be a mixture of an organic pigment and an inorganic pigment. The organic pigment may be an organic pigment having a metal atom, and may be an organic pigment not having a metal atom.

From the viewpoint of further enhancing the heat shielding property, it is preferred that the pigment include a heat shielding pigment, and it is preferred that the pigment be a heat shielding pigment. The heat shielding pigment is a pigment having heat shielding property. The pigment may be heat shielding particles. From the viewpoint of imparting color tone to the interlayer film, it is preferred that the pigment include a coloring pigment, and it is preferred that the pigment be a coloring pigment. The pigment may be a pigment that is a heat shielding pigment and a coloring pigment.

Examples of the organic pigment include an azo compound (azo pigment), and a condensed polycyclic compound (condensed polycyclic pigment) and the like. Examples of the condensed polycyclic compound include a phthalocyanine compound, a quinacridone compound, a pentaphene compound, a dioxazine compound, a perylene compound, and an indole compound and the like. From the viewpoint of making bluish fogging still less likely to occur, it is preferred that the organic pigment be an azo compound, a phthalocyanine compound, a quinacridone compound, a pentaphene compound, a dioxazine compound, a perylene compound, or an indole compound, and it is more preferred that the organic pigment be a quinacridone compound or a perylene compound.

Examples of the phthalocyanine compound include phthalocyanine and derivatives of phthalocyanine. The phthalocyanine compound has a phthalocyanine skeleton.

From the viewpoints of effectively enhancing the heat shielding property and maintaining the visible light transmittance at a higher level over a long period of time, it is preferred that the phthalocyanine compound contain vanadium atoms or copper atoms. The phthalocyanine compound preferably contains a vanadium atom, and also preferably contains a copper atom. It is more preferred that the phthalocyanine compound be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the phthalocyanine compound have a structural unit in which an oxygen atom is bonded to a vanadium atom.

Examples of the quinacridone compound include quinacridone and derivatives of quinacridone. The quinacridone compound has a quinacridone skeleton.

Examples of the pentaphene compound include pentaphene and derivatives of pentaphene. The pentaphene compound has a pentaphene skeleton.

Examples of the dioxazine compound include dioxazine and derivatives of dioxazine. The dioxazine compound has a dioxazine skeleton.

Examples of the perylene compound include perylene and derivatives of perylene. The perylene compound has a perylene skeleton.

Examples of the indole compound include indole and derivatives of indole. The indole compound has an indole skeleton.

Examples of the inorganic pigment include carbon black, graphene, iron oxide particles, zinc oxide particles, titanium oxide particles, aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles (CWO particles), thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like.

For excellent heat ray shielding function, it is preferred that the inorganic pigment be ATO particles, GZO particles, IZO particles, ITO particles, sodium-doped tungsten oxide particles, CWO particles, thallium-doped tungsten oxide particles, or rubidium-doped tungsten oxide particles, and it is more preferred that the inorganic pigment be ITO particles or CWO particles.

From the viewpoint of still further enhancing the heat shielding property of the interlayer film and the laminated glass, it is preferred that the CWO particles be tungsten oxide particles represented by the formula: $Cs_{0.33}WO_3$.

From the viewpoint of favorably imparting color tone to the interlayer film, it is preferred that the coloring pigment be an azo compound, a condensed polycyclic compound, carbon black, or graphene, and it is more preferred that the coloring pigment be an azo compound, a phthalocyanine compound, carbon black, or graphene.

From the viewpoint of making bluish fogging still less likely to occur, it is preferred that the pigment include carbon black or graphene (in the present specification, "carbon black or graphene" is sometimes described as "inorganic pigment (X)"). From the viewpoint of making bluish fogging still less likely to occur, it is more preferred that the pigment include carbon black. It is preferred that the inorganic pigment (X) include carbon black. The pigment may include an inorganic pigment other than carbon black and graphene (in the present specification, "inorganic pigment other than carbon black and graphene" is sometimes described as "inorganic pigment (Y)"). From the viewpoint of making bluish fogging still less likely to occur, when the pigment includes the inorganic pigment (Y), it is preferred that the pigment include ITO particles or CWO particles. It is preferred that the inorganic pigment (Y) include ITO particles or CWO particles.

From the viewpoint of making bluish fogging still less likely to occur, it is preferred that the pigment include a quinacridone compound, a perylene compound, carbon black, ITO particles or CWO particles.

The average particle diameter of the pigment is preferably 0.1 nm or more, more preferably 1.0 nm or more, and is preferably 70 nm or less, more preferably 60 nm or less, still more preferably 50 nm or less, further preferably 40 nm or less, especially preferably 30 nm or less, most preferably 26.5 nm or less. When the average particle diameter of the pigment is the above-described lower limit or more, it is possible to further enhance the heat ray shielding property when the pigment is a heat shielding pigment. When the average particle diameter of the pigment is the above-described upper limit or less, it is possible to make bluish fogging still less likely to occur. In the case where two or more kinds of pigments are used in combination as the pigment, it is preferred that the average particle diameter of each of the pigments satisfy the above-described lower limit or upper limit.

The average particle diameter of the pigment as a whole contained in the interlayer film is preferably 0.1 nm or more, more preferably 1.0 nm or more, and is preferably 70 nm or less, more preferably 60 nm or less, still more preferably 50 nm or less, further preferably 40 nm or less, especially preferably nm or less, most preferably 26.5 nm or less. When the average particle diameter of the pigment as a whole is the above-described lower limit or more, it is possible to further enhance the heat ray shielding property when the pigment is a heat shielding pigment. When the average particle diameter of the pigment as a whole is the above-described upper limit or less, it is possible to make bluish fogging still less likely to occur.

From the viewpoint of making bluish fogging still less likely to occur, when the pigment includes only one kind of pigment, it is preferred that the average particle diameter of the pigment be 70 nm or less, whereas when the pigment includes two or more kinds of pigments, it is preferred that the average particle diameter of each of the two or more kinds of pigments be 70 nm or less. When the pigment includes only one kind of pigment, the average particle diameter of the pigment is preferably 0.1 nm or more, more preferably 1.0 nm or more, and is preferably 70 nm or less, more preferably 60 nm or less, still more preferably 50 nm or less, further preferably 40 nm or less, especially preferably 30 nm or less, most preferably 26.5 nm or less. When the pigment includes two or more kinds of pigments, the average particle diameter of each of the two or more kinds of pigments is preferably 0.1 nm or more, more preferably 1.0 nm or more, and is preferably 70 nm or less, more preferably 60 nm or less, still more preferably 50 nm or less, further preferably 40 nm or less, especially preferably 30 nm or less, most preferably 26.5 nm or less. When the average particle diameter of the pigment is the above-described lower limit or more, it is possible to further enhance the heat ray shielding property when the pigment is a heat shielding pigment. When the average particle diameter of the pigment is the above-described upper limit or less, it is possible to make bluish fogging still less likely to occur.

From the viewpoint of making bluish fogging still less likely to occur, when the pigment includes an organic pigment, the average particle diameter of the organic pigment is preferably 0.1 nm or more, more preferably 1.0 nm or more. From the viewpoint of making bluish fogging still less likely to occur, when the pigment includes an organic pigment, the average particle diameter of the organic pigment is preferably 70 nm or less, more preferably 60 nm or less, still more preferably 50 nm or less, further preferably 40 nm or less, especially preferably 30 nm or less, most preferably 26.5 nm or less. When the average particle diameter of the organic pigment is the above-described lower limit or more, it is possible to further enhance the heat ray shielding property when the organic pigment is a heat shielding pigment. When the average particle diameter of the organic pigment is the above-described upper limit or less, it is possible to make bluish fogging still less likely to occur. In the case where two or more kinds of organic pigments are used in combination as the organic pigment, it is preferred that the average particle diameter of each of the organic pigments satisfy the above-described lower limit or upper limit.

From the viewpoint of making bluish fogging still less likely to occur, when the pigment includes an organic pigment, the average particle diameter of the pigment as a whole contained in the interlayer film is preferably 0.1 nm or more, more preferably 1.0 nm or more. From the viewpoint of making bluish fogging still less likely to occur, when the pigment includes an organic pigment, the average particle diameter of the organic pigment as a whole contained in the interlayer film is preferably 70 nm or less, more preferably 60 nm or less, still more preferably 50 nm or less, further preferably 40 nm or less, especially preferably 30 nm or less, most preferably 26.5 nm or less. When the average particle diameter of the organic pigment as a whole is the above-described lower limit or more, it is possible to further enhance the heat ray shielding property when the organic pigment is a heat shielding pigment. When the average particle diameter of the organic pigment as a whole is the above-described upper limit or less, it is possible to make bluish fogging still less likely to occur.

From the viewpoint of making bluish fogging still less likely to occur, when the organic pigment includes only one kind of organic pigment, it is preferred that the average particle diameter of the organic pigment be 70 nm or less, whereas when the organic pigment includes two or more kinds of organic pigments, it is preferred that the average particle diameter of each of the two or more kinds of organic pigments be 70 nm or less. When the organic pigment includes only one kind of pigment, the average particle diameter of the organic pigment is preferably 0.1 nm or more, more preferably 1.0 nm or more, and is preferably 70 nm or less, more preferably 60 nm or less, still more preferably 50 nm or less, further preferably 40 nm or less, especially preferably 30 nm or less, most preferably 26.5 nm or less. When the organic pigment includes two or more kinds of organic pigments, the average particle diameter of each of the two or more kinds of organic pigments is preferably 0.1 nm or more, more preferably 1.0 nm or more. When the organic pigment includes two or more kinds of organic pigments, the average particle diameter of each of the two or more kinds of organic pigments is preferably 70 nm or less, more preferably 60 nm or less, still more preferably 50 nm or less, further preferably 40 nm or less, especially preferably 30 nm or less, most preferably 26.5 nm or less. When the average particle diameter of the organic pigment is the above-described lower limit or more, it is possible to further enhance the heat ray shielding property when the organic pigment is a heat shielding pigment. When the average particle diameter of the organic pigment is the above-described upper limit or less, it is possible to make bluish fogging still less likely to occur.

From the viewpoint of making bluish fogging still less likely to occur, when the pigment includes an inorganic pigment, the average particle diameter of the inorganic pigment is preferably 0.1 nm or more, more preferably 1.0 nm or more. From the viewpoint of making bluish fogging still less likely to occur, when the pigment includes an inorganic pigment, the average particle diameter of the inorganic pigment is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment is the above-described lower limit or more, it is possible to further enhance the heat ray shielding property when the inorganic pigment is a heat shielding pigment. When the average particle diameter of the inorganic pigment is the above-described upper limit or less, it is possible to make bluish fogging still less likely to occur. In the case where two or more kinds of inorganic pigments are used in combination as the inorganic pigment, it is preferred that the average particle diameter of each of the inorganic pigments satisfy the above-described lower limit or upper limit.

From the viewpoint of making bluish fogging still less likely to occur, when the pigment includes an inorganic pigment, the average particle diameter of the inorganic pigment as a whole contained in the interlayer film is preferably 0.1 nm or more, more preferably 1.0 nm or more. From the viewpoint of making bluish fogging still less likely to occur, when the pigment includes an inorganic pigment, the average particle diameter of the inorganic pigment as a whole contained in the interlayer film is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment as a whole is the above-described lower limit or more, it is possible to further enhance the heat ray shielding property when the inorganic pigment is a heat shielding pigment. When the average particle diameter of the inorganic pigment as a whole is the above-described upper limit or less, it is possible to make bluish fogging still less likely to occur.

From the viewpoint of making bluish fogging still less likely to occur, when the inorganic pigment includes only one kind of inorganic pigment, it is preferred that the average particle diameter of the inorganic pigment be 70 nm or less, whereas when the inorganic pigment includes two or more kinds of inorganic pigments, it is preferred that the average particle diameter of each of the two or more kinds of inorganic pigments be 70 nm or less. When the inorganic pigment includes only one kind of pigment, the average particle diameter of the inorganic pigment is preferably 0.1 nm or more, more preferably 1.0 nm or more, and is preferably 70 nm or less, more preferably 60 nm or less, still more preferably 50 nm or less, further preferably nm or less, especially preferably 30 nm or less, most preferably 26.5 nm or less. When the inorganic pigment includes two or more kinds of inorganic pigments, the average particle diameter of each of the two or more kinds of inorganic pigments is preferably 0.1 nm or more, more preferably 1.0 nm or more. When the inorganic pigment includes two or more kinds of inorganic pigments, the average particle diameter of each of the two or more kinds of inorganic pigments is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment is the above-described lower limit or more, it is possible to further enhance the heat ray shielding property when the inorganic pigment is a heat shielding pigment. When the average particle diameter of the inorganic pigment is the above-described upper limit or less, it is possible to make bluish fogging still less likely to occur.

From the viewpoint of making bluish fogging still less likely to occur, when the pigment includes the inorganic pigment (X) (namely, carbon black or graphene), the average particle diameter of the inorganic pigment (X) is preferably 0.1 nm or more, more preferably 1.0 nm or more. From the viewpoint of making bluish fogging still less likely to occur, when the pigment includes the inorganic pigment (X), the average particle diameter of the inorganic pigment (X) is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment (X) is the above-described lower limit or more, it is possible to further enhance the heat ray shielding property when the inorganic pigment (X) is a heat shielding pigment. When the average particle diameter of the inorganic pigment (X) is the above-described upper limit or less, it is possible to make bluish fogging still less likely to occur. In the case where two or more kinds of inorganic pigments (X) are used in combination as the inorganic pigment (X), it is preferred that the average particle diameter of each of the inorganic pigments (X) satisfy the above-described lower limit or upper limit.

From the viewpoint of making bluish fogging still less likely to occur, when the pigment includes the inorganic pigment (X), the average particle diameter of the inorganic pigment (X) as a whole contained in the interlayer film is preferably 0.1 nm or more, more preferably 1.0 nm or more. From the viewpoint of making bluish fogging still less likely to occur, when the pigment includes the inorganic pigment (X), the average particle diameter of the inorganic pigment (X) as a whole contained in the interlayer film is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment (X) as a whole is the above-described lower limit or more, it is possible to further enhance the heat ray shielding property when the inorganic pigment (X) is a heat shielding pigment. When the average particle diameter of the inorganic pigment (X) as a whole is the above-described upper limit or less, it is possible to make bluish fogging still less likely to occur.

From the viewpoint of making bluish fogging still less likely to occur, when the inorganic pigment (X) includes only one kind of inorganic pigment (X), it is preferred that the average particle diameter of the inorganic pigment (X) be 70 nm or less, whereas when the inorganic pigment (X) includes two or more kinds of inorganic pigments (X), it is preferred that the average particle diameter of each of the two or more kinds of inorganic pigments (X) be 70 nm or less. When the inorganic pigment (X) includes only one kind of inorganic pigment (X), the average particle diameter of the inorganic pigment (X) is preferably 0.1 nm or more, more preferably 1.0 nm or more, and is preferably 70 nm or less, more preferably 60 nm or less, still more preferably 50 nm or less, further preferably 40 nm or less, especially preferably 30 nm or less, most preferably 26.5 nm or less. When the inorganic pigment (X) includes two or more kinds of inorganic pigments (X), the average particle diameter of each of the two or more kinds of inorganic pigments (X) is preferably 70 nm or less, more preferably 60 nm or less, still more preferably 50 nm or less, further preferably 40 nm or less, especially preferably 30 nm or less, most preferably 26.5 nm or less. When the average particle diameter of the inorganic pigment (X) is the above-described lower limit or more, it is possible to further enhance the heat ray shielding property when the inorganic pigment (X) is a heat shielding pigment. When the average particle diameter of the inorganic pigment (X) is the above-described upper limit or less, it is possible to make bluish fogging still less likely to occur.

From the viewpoint of making bluish fogging still less likely to occur, when the pigment includes the inorganic pigment (Y) (namely, inorganic pigment other than carbon black and graphene), the average particle diameter of the inorganic pigment (Y) is preferably 0.1 nm or more, more preferably 1.0 nm or more. From the viewpoint of making bluish fogging still less likely to occur, when the pigment includes the inorganic pigment (Y), the average particle diameter of the inorganic pigment (Y) is preferably 50 nm or less, more preferably 40 nm or less, further preferably 30 nm or less, especially preferably 26.5 nm or less. When the average particle diameter of the inorganic pigment (Y) is the above-described lower limit or more, it is possible to further enhance the heat ray shielding property when the inorganic pigment (Y) is a heat shielding pigment. When the average particle diameter of the inorganic pigment (Y) is the above-described upper limit or less, it is possible to make bluish fogging still less likely to occur. In the case where two or more kinds of inorganic pigments (Y) are used in combination as the inorganic pigment (Y), it is preferred that the average particle diameter of each of the inorganic pigments (Y) satisfy the above-described lower limit or upper limit.

From the viewpoint of making bluish fogging still less likely to occur, when the pigment includes the inorganic pigment (Y), the average particle diameter of the inorganic pigment (Y) as a whole contained in the interlayer film is preferably 0.1 nm or more, more preferably 1.0 nm or more. From the viewpoint of making bluish fogging still less likely to occur, when the pigment includes the inorganic pigment (Y), the average particle diameter of the inorganic pigment (Y) as a whole contained in the interlayer film is preferably 50 nm or less, more preferably nm or less, further preferably 30 nm or less, especially preferably 26.5 nm or less. When the average particle diameter of the inorganic pigment (Y) as a whole is the above-described lower limit or more, it is possible to further enhance the heat ray shielding property when the inorganic pigment (Y) is a heat shielding pigment. When the average particle diameter of the inorganic pigment (Y) as a whole is the above-described upper limit or less, it is possible to make bluish fogging still less likely to occur.

From the viewpoint of making bluish fogging still less likely to occur, when the inorganic pigment (Y) includes only one kind of inorganic pigment (Y), it is preferred that the average particle diameter of the inorganic pigment (Y) be 50 nm or less, whereas when the inorganic pigment (Y) includes two or more kinds of inorganic pigments (Y), it is preferred that the average particle diameter of each of the two or more kinds of inorganic pigments (Y) be 50 nm or less. When the inorganic pigment (Y) includes only one kind of inorganic pigment (Y), the average particle diameter of the inorganic pigment (Y) is preferably 0.1 nm or more, more preferably 1.0 nm or more, and is preferably 50 nm or less, more preferably 40 nm or less, further preferably 30 nm or less, especially preferably 26.5 nm or less. When the inorganic pigment (Y) includes two or more kinds of inorganic pigments (Y), the average particle diameter of each of the two or more kinds of inorganic pigments (Y) is preferably 50 nm or less, more preferably 40 nm or less, further preferably 30 nm or less, especially preferably 26.5 nm or less. When the average particle diameter of the inorganic pigment (Y) is the above-described lower limit or more, it is possible to further enhance the heat ray shielding property when the inorganic pigment (Y) is a heat shielding pigment. When the average particle diameter of the inorganic pigment (Y) is the above-described upper limit or less, it is possible to make bluish fogging still less likely to occur.

The average particle diameter of the pigment means an average equivalent circle diameter. The average particle diameter of the pigment can be measured in the following manner.

A polyvinyl butyral resin (the polymerization degree of polyvinyl alcohol of 1700, the content of the hydroxyl group of 30% by mole, the acetylation degree of 1% by mole, the butyralization degree of 69% by mole) is prepared. One hundred parts by weight of the polyvinyl butyral resin, 40 parts by weight of triethylene glycol di-2-ethylhexanoate (3GO), and a pigment in a content of 0.015% by weight in 100% by weight of the total amount of the polyvinyl butyral resin, 3GO and the pigment are kneaded and extruded to give a resin film (single layer, resin film for evaluation) having a thickness of 760 μm. The obtained resin film is observed under an electron microscopy such as a transmission electron microscopy (TEM). The micrograph is analyzed, and an equivalent circle diameter of each pigment is calculated. The mean value of equivalent circle diameters of 50 random pigments is defined as an average particle diameter (average equivalent circle diameter) of pigment.

From the viewpoint of making bluish fogging still less likely to occur, the average aspect ratio of the pigment is preferably 4.0 or less, more preferably 3.5 or less, further preferably 3.0 or less. From the viewpoint of making bluish fogging still less likely to occur, the closer to 1 the average aspect ratio of the pigment is, the better. From the viewpoint of enhancing the heat shielding property, the average aspect ratio of the pigment is preferably more than 1, more preferably 1.2 or more. In the case where two or more kinds of pigments are used in combination as the pigment, it is preferred that the average aspect ratio of each of the pigments satisfy the above-described lower limit or upper limit.

From the viewpoint of making bluish fogging still less likely to occur, the average aspect ratio of the pigment as a whole contained in the interlayer film is preferably 4.0 or less, more preferably 3.5 or less, further preferably 3.0 or less. From the viewpoint of making bluish fogging still less likely to occur, the closer to 1 the average aspect ratio of the pigment as a whole contained in the interlayer film is, the better. From the viewpoint of enhancing the heat shielding property, the average aspect ratio of the pigment as a whole contained in the interlayer film is preferably more than 1, more preferably 1.2 or more.

From the viewpoint of making bluish fogging still less likely to occur, when the pigment includes only one kind of pigment, it is preferred that the average aspect ratio of the pigment be 4.0 or less, whereas when the pigment includes two or more kinds of pigments, it is preferred that the average aspect ratio of each of the two or more kinds of pigments be 4.0 or less. When the pigment includes only one kind of pigment, the average aspect ratio of the pigment is preferably 4.0 or less, more preferably 3.5 or less, further preferably 3.0 or less. From the viewpoint of making bluish fogging still less likely to occur, when the pigment includes only one kind of pigment, the closer to 1 the average aspect ratio of the pigment is, the better. From the viewpoint of enhancing the heat shielding property, when the pigment includes only one kind of pigment, the average aspect ratio of the pigment is preferably more than 1, more preferably 1.2 or more. When the pigment includes two or more kinds of pigments, the average aspect ratio of each of the two or more kinds of pigments is preferably 4.0 or less, more preferably 3.5 or less, further preferably 3.0 or less. From the viewpoint of making bluish fogging still less likely to occur, when the pigment includes two or more kinds of pigments, the closer to 1 the average aspect ratio of each of the two or more kinds of pigments is, the better. From the viewpoint of enhancing the heat shielding property, when the pigment includes two or more kinds of pigments, the average aspect ratio of each of the two or more kinds of pigments is preferably more than 1, more preferably 1.2 or more.

From the viewpoint of making bluish fogging still less likely to occur, when the pigment includes an organic pigment, the average aspect ratio of the organic pigment is preferably 4.0 or less, more preferably 3.5 or less, further preferably 3.0 or less. From the viewpoint of making bluish fogging still less likely to occur, the closer to 1 the average aspect ratio of the organic pigment is, the better. From the viewpoint of enhancing the heat shielding property, the average aspect ratio of the organic pigment is preferably more than 1, more preferably 1.2 or more. In the case where two or more kinds of organic pigments are used in combination as the organic pigment, it is preferred that the average aspect ratio of each of the organic pigments satisfy the above-described lower limit or upper limit.

From the viewpoint of making bluish fogging still less likely to occur, when the pigment includes an organic pigment, the average aspect ratio of the organic pigment as a whole contained in the interlayer film is preferably 4.0 or less, more preferably 3.5 or less, further preferably 3.0 or less. From the viewpoint of making bluish fogging still less likely to occur, the closer to 1 the average aspect ratio of the organic pigment as a whole contained in the interlayer film is, the better. From the viewpoint of enhancing the heat shielding property, the average aspect ratio of the organic pigment as a whole contained in the interlayer film is preferably more than 1, more preferably 1.2 or more.

From the viewpoint of making bluish fogging still less likely to occur, when the pigment includes an organic pigment, and the organic pigment includes only one kind of organic pigment, it is preferred that the average aspect ratio of the organic pigment be 4.0 or less, whereas when the organic pigment includes two or more kinds of organic pigments, it is preferred that the average aspect ratio of each of the two or more kinds of organic pigments be 4.0 or less. When the organic pigment includes only one kind of organic pigment, the average aspect ratio of the organic pigment is preferably 4.0 or less, more preferably 3.5 or less, further preferably 3.0 or less. From the viewpoint of making bluish fogging still less likely to occur, when the organic pigment includes only one kind of organic pigment, the closer to 1 the average aspect ratio of the organic pigment is, the better. From the viewpoint of enhancing the heat shielding property, when the organic pigment includes only one kind of organic pigment, the average aspect ratio of the organic pigment is preferably more than 1, more preferably 1.2 or more. When the organic pigment includes two or more kinds of organic pigments, the average aspect ratio of each of the two or more kinds of organic pigments is preferably 4.0 or less, more preferably 3.5 or less, further preferably 3.0 or less. From the viewpoint of making bluish fogging still less likely to occur, when the organic pigment includes two or more kinds of organic pigments, the closer to 1 the average aspect ratio of each of the two or more kinds of organic pigments is, the better. From the viewpoint of enhancing the heat shielding property, when the organic pigment includes two or more kinds of organic pigments, the average aspect ratio of each of the two or more kinds of organic pigments is preferably more than 1, more preferably 1.2 or more.

From the viewpoint of making bluish fogging still less likely to occur, when the pigment includes an inorganic pigment, the average aspect ratio of the inorganic pigment is preferably 4.0 or less, more preferably 3.5 or less, further preferably 3.0 or less. From the viewpoint of making bluish fogging still less likely to occur, the closer to 1 the average aspect ratio of the inorganic pigment is, the better. From the viewpoint of enhancing the heat shielding property, the average aspect ratio of the inorganic pigment is preferably more than 1, more preferably 1.2 or more. In the case where two or more kinds of inorganic pigments are used in combination as the inorganic pigment, it is preferred that the average aspect ratio of each of the inorganic pigments satisfy the above-described lower limit or upper limit.

From the viewpoint of making bluish fogging still less likely to occur, when the pigment includes an inorganic pigment, the average aspect ratio of the inorganic pigment as a whole contained in the interlayer film is preferably 4.0 or less, more preferably 3.5 or less, further preferably 3.0 or less. From the viewpoint of making bluish fogging still less likely to occur, the closer to 1 the average aspect ratio of the inorganic pigment as a whole contained in the interlayer film is, the better. From the viewpoint of enhancing the heat shielding property, the average aspect ratio of the inorganic pigment as a whole contained in the interlayer film is preferably more than 1, more preferably 1.2 or more.

From the viewpoint of making bluish fogging still less likely to occur, when the pigment includes an inorganic pigment, and the inorganic pigment includes only one kind of inorganic pigment, it is preferred that the average aspect ratio of the inorganic pigment be 4.0 or less, whereas when the inorganic pigment includes two or more kinds of inorganic pigments, it is preferred that the average aspect ratio of each of the two or more kinds of inorganic pigments be 4.0 or less. When the inorganic pigment includes only one kind of inorganic pigment, the average aspect ratio of the inorganic pigment is preferably 4.0 or less, more preferably 3.5 or less, further preferably 3.0 or less. From the viewpoint of making bluish fogging still less likely to occur, when the inorganic pigment includes only one kind of inorganic pigment, the closer to 1 the average aspect ratio of the inorganic pigment is, the better. From the viewpoint of enhancing the heat shielding property, when the inorganic pigment includes only one kind of inorganic pigment, the average aspect ratio of the inorganic pigment is preferably more than 1, more preferably 1.2 or more. When the inorganic pigment includes two or more kinds of inorganic pigments, the average aspect ratio of each of the two or more kinds of inorganic pigments is preferably 4.0 or less, more preferably 3.5 or less, further preferably 3.0 or less. From the viewpoint of making bluish fogging still less likely to occur, when the inorganic pigment includes two or more kinds of inorganic pigments, the closer to 1 the average aspect ratio of each of the two or more kinds of inorganic pigments is, the better. From the viewpoint of enhancing the heat shielding property, when the inorganic pigment includes two or more kinds of inorganic pigments, the average aspect ratio of each of the two or more kinds of inorganic pigments is preferably more than 1, more preferably 1.2 or more.

The aspect ratio of the pigment indicates major axis/minor axis. The average aspect ratio of the pigment can be measured in the following manner.

A resin film having a thickness of 760 μm (single layer, resin film for evaluation) is obtained in the same manner as the aforementioned method for measuring an average particle diameter of the pigment. The obtained resin film is observed under an electron microscopy such as a transmission electron microscopy (TEM). The micrograph is analyzed, and an aspect ratio (major axis/minor axis) of each pigment is calculated. The mean value of aspect ratios of 50 random pigments is defined as an average aspect ratio of pigment.

In 100% of the total number of pigments, the number of pigments having an aspect ratio of 4.0 or less is preferably 50% or more, more preferably 70% or more, further preferably 90% or more. When the number of pigments having an aspect ratio of 4.0 or less is the above-described lower limit or more, it is possible to make bluish fogging still less likely to occur.

In 100% of the total number of pigments, the number of pigments having an aspect ratio of 3.5 or less is preferably 50% or more, more preferably 70% or more, further preferably 90% or more. When the number of pigments having an aspect ratio of 3.5 or less is the above-described lower limit or more, it is possible to make bluish fogging still less likely to occur.

In 100% of the total number of pigments, the number of pigments having an aspect ratio of 3.0 or less is preferably 50% or more, more preferably 70% or more, further preferably 90% or more. When the number of pigments having an aspect ratio of 3.0 or less is the above-described lower limit or more, it is possible to make bluish fogging still less likely to occur.

In the interlayer film, or in a layer containing the pigment (a first layer, a second layer, or a third layer), an average distance between neighboring pigments is preferably 0.1 μm or more, more preferably 1 μm or more, and is preferably 100 μm or less, more preferably 10 μm or less. When the average distance is the above-described lower limit or more and the above-described upper limit or less, it is possible to make bluish fogging still less likely to occur.

In the case where the pigment includes an organic pigment, in the interlayer film, or in a layer containing the organic pigment (a first layer, a second layer, or a third layer), an average distance between neighboring organic pigments is preferably 0.1 µm or more, more preferably 1 µm or more, and is preferably 100 µm or less, more preferably 10 µm or less. When the average distance is the above-described lower limit or more and the above-described upper limit or less, it is possible to make bluish fogging still less likely to occur.

In the case where the pigment includes an inorganic pigment, in the interlayer film, or in a layer containing then inorganic pigment (a first layer, a second layer, or a third layer), an average distance between neighboring inorganic pigments is preferably 0.1 µm or more, more preferably 1 µm or more, and is preferably 100 µm or less, more preferably 10 µm or less. When the average distance is the above-described lower limit or more and the above-described upper limit or less, it is possible to make bluish fogging still less likely to occur.

The average distance between neighboring pigments is an average of surface-to-surface distances of neighboring two pigments. The distance between neighboring pigments is a surface-to-surface distance between any one of pigments and the pigment closest to the one pigment.

In 100% by weight of the interlayer film or in 100% by weight of a layer containing the pigment (a first layer, a second layer, or a third layer), the content of the pigment is preferably 0.0001% by weight or more, more preferably 0.001% by weight or more. In 100% by weight of the interlayer film or in 100% by weight of a layer containing the pigment (a first layer, a second layer, or a third layer), the content of the pigment is preferably 2% by weight or less, more preferably 18 by weight or less, still more preferably 0.1% by weight or less, further preferably 0.012% by weight or less, especially preferably 0.010% by weight or less, most preferably 0.008% by weight or less. When the content of the pigment is the above-described lower limit or more and the above-described upper limit or less, it is possible to make bluish fogging still less likely to occur. Also, when the content of the pigment is the above lower limit or more and the above upper limit or less, it is possible to further enhance the heat shielding property, and impart color tone to the interlayer film favorably.

In the case where the interlayer film includes the organic pigment, in 100% by weight of the interlayer film or in 100% by weight of a layer containing the organic pigment (a first layer, a second layer, or a third layer), the content of the organic pigment is preferably 0.0001% by weight or more, more preferably 0.001% by weight or more. In the case where the interlayer film includes the organic pigment, in 100% by weight of the interlayer film or in 100% by weight of a layer containing the organic pigment (a first layer, a second layer, or a third layer), the content of the organic pigment is preferably 2% by weight or less, more preferably 18 by weight or less. In the case where the interlayer film contains the organic pigment, in 100% by weight of the interlayer film or in 100% by weight of a layer containing the organic pigment (a first layer, a second layer, or a third layer), the content of the organic pigment is still more preferably 0.1% by weight or less, further preferably 0.012% by weight or less, especially preferably 0.010% by weight or less, most preferably 0.008% by weight or less. When the content of the organic pigment is the above-described lower limit or more and the above-described upper limit or less, it is possible to make bluish fogging still less likely to occur. Also, when the content of the organic pigment is the above lower limit or more and the above upper limit or less, it is possible to further enhance the heat shielding property, and impart color tone to the interlayer film favorably.

In the case where the interlayer film includes the inorganic pigment, in 100% by weight of the interlayer film or in 100% by weight of a layer containing the inorganic pigment (a first layer, a second layer, or a third layer), the content of the inorganic pigment is preferably 0.0001% by weight or more, more preferably 0.001% by weight or more. In the case where the interlayer film includes the inorganic pigment, in 100% by weight of the interlayer film or in 100% by weight of a layer containing the inorganic pigment (a first layer, a second layer, or a third layer), the content of the inorganic pigment is preferably 2% by weight or less, more preferably 18 by weight or less. In the case where the interlayer film contains the inorganic pigment, in 100% by weight of the interlayer film or in 100% by weight of a layer containing the inorganic pigment (a first layer, a second layer, or a third layer), the content of the inorganic pigment is still more preferably 0.1% by weight or less, further preferably 0.012% by weight or less, especially preferably 0.010% by weight or less, most preferably 0.008% by weight or less. When the content of the inorganic pigment is the above-described lower limit or more and the above-described upper limit or less, it is possible to make bluish fogging still less likely to occur. Also, when the content of the inorganic pigment is the above lower limit or more and the above upper limit or less, it is possible to further enhance the heat shielding property, and impart color tone to the interlayer film favorably.

In the interlayer film or in a layer containing the pigment (a first layer, a second layer, or a third layer), the density of the pigment is preferably $0.0001$ g/cm$^3$ or more, more preferably $0.001$ g/cm$^3$ or more. In the interlayer film or in a layer containing the pigment (a first layer, a second layer, or a third layer), the density of the pigment is preferably 2 g/cm$^3$ or less, more preferably 1 g/cm$^3$ or less. In the interlayer film or in a layer containing the pigment (a first layer, a second layer, or a third layer), the density of the pigment is still more preferably 0.1 g/cm$^3$ or less, further preferably 0.012 g/cm$^3$ or less, especially preferably 0.010 g/cm$^3$ or less, most preferably 0.008 g/cm$^3$ or less. When the density of the pigment is the above-described lower limit or more and the above-described upper limit or less, it is possible to make bluish fogging still less likely to occur. Also, when the density of the pigment is the above lower limit or more and the above upper limit or less, it is possible to further enhance the heat shielding property, and impart color tone to the interlayer film favorably.

In the case where the interlayer film contains the organic pigment, in the interlayer film or in a layer containing the organic pigment (a first layer, a second layer, or a third layer), the density of the organic pigment is preferably 0.0001 g/cm$^3$ or more, more preferably 0.001 g/cm$^3$ or more. In the case where the interlayer film contains the organic pigment, in the interlayer film or in a layer containing the organic pigment (a first layer, a second layer, or a third layer), the density of the organic pigment is preferably 2 g/cm$^3$ or less, more preferably 1 g/cm$^3$ or less. In the case where the interlayer film contains the organic pigment, in the interlayer film or in a layer containing the organic pigment (a first layer, a second layer, or a third layer), the density of the organic pigment is still more preferably 0.1 g/cm$^3$ or less, further preferably 0.012 g/cm$^3$ or less, especially preferably 0.010 g/cm$^3$ or less, most preferably 0.008 g/cm$^3$ or less. When the density of the organic pigment is the above-described lower limit or more and the above-described upper limit or less, it is possible to make bluish fogging still less likely to occur. Also, when the density of the organic pigment is the above lower limit or more and the above upper limit or less, it is possible to further enhance the heat shielding property, and impart color tone to the interlayer film favorably.

In the case where the interlayer film contains the inorganic pigment, in the interlayer film or in a layer containing the inorganic pigment (a first layer, a second layer, or a third layer), the density of the inorganic pigment is preferably 0.0001 g/cm$^3$ or more, more preferably 0.001 g/cm$^3$ or more. In the case where the interlayer film contains the inorganic pigment, in the interlayer film or in a layer containing the inorganic pigment (a first layer, a second layer, or a third layer), the density of the inorganic pigment is preferably 2 g/cm$^3$ or less, more preferably 1 g/cm$^3$ or less. In the case where the interlayer film contains the inorganic pigment, in the interlayer film or in a layer containing the inorganic pigment (a first layer, a second layer, or a third layer), the density of the inorganic pigment is still more preferably 0.1 g/cm$^3$ or less, further preferably 0.012 g/cm$^3$ or less, especially preferably 0.010 g/cm$^3$ or less, most preferably 0.008 g/cm$^3$ or less. When the density of the inorganic pigment is the above-described lower limit or more and the above-described upper limit or less, it is possible to make bluish fogging still less likely to occur. Also, when the density of the inorganic pigment is the above lower limit or more and the above upper limit or less, it is possible to further enhance the heat shielding property, and impart color tone to the interlayer film favorably.

(Thermoplastic Resin)

It is preferred that the interlayer film contain a resin (hereinafter, sometimes described as a resin (0)). It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a resin (hereinafter, sometimes described as a resin (1)). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a resin (hereinafter, sometimes described as a resin (2)). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a resin (hereinafter, sometimes described as a resin (3)). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The resin (1), the resin (2), and the resin (3) may be the same as or different from one another. For still higher sound insulating property, it is preferred that the resin (1) be different from the resin (2) and the resin (3). The thermoplastic resin (1), the thermoplastic resin (2), and the thermoplastic resin (3) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), and the polyvinyl acetal resin (3) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

The polyvinyl acetal resin can be produced, for example, by acetalizing polyvinyl alcohol (PVA) with an aldehyde. It is preferred that the polyvinyl acetal resin be an acetalized product of polyvinyl alcohol. The polyvinyl alcohol can be obtained, for example, by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, and is preferably 5000 or less, more preferably 4000 or less, further preferably 3500 or less. When the average polymerization degree is the above lower limit or more, the penetration resistance of the laminated glass is further enhanced. When the average polymerization degree is the above upper limit or less, formation of an interlayer film is facilitated.

The polymerization degree of the polyvinyl alcohol is determined by a method conforming to JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more, more preferably 18% by mole or more and is preferably 40% by mole or less, more preferably 35% by mole or less. When the content of the hydroxyl group is the above lower limit or more, the adhesive force of the interlayer film is further enhanced. Moreover, when the content of the hydroxyl group is the above-described upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above-described upper limit or less than the above-described upper limit, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, still more preferably 30% by mole or more, further preferably more than 31% by mole, still further preferably 31.5% by mole or more, especially preferably 32% by mole or more, and most preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above-described lower limit or more or more than the above-described lower limit, the adhesive force of the interlayer film is further enhanced. Moreover, when the content of the hydroxyl group is the above-described upper limit or less, the flexibility of the interlayer film is enhanced and the handling of the interlayer film is facilitated.

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). From the viewpoint of still further enhancing the sound insulating property, the absolute value of difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating property, the absolute value of difference between the content of the hydroxyl group of the polyvinyl acetal resin (1) and the content of the hydroxyl group of the polyvinyl acetal resin (3) is preferably 18 by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more, and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the degree (the butyralization degree) and the acetalization acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin may be 100% by weight or less. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin may be 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin may be 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin may be 100% by weight or less. It is preferred that the main ingredient (50% by weight or more) of the thermoplastic resin of the third layer be a polyvinyl acetal resin.

(Plasticizer)

From the viewpoint of further enhancing the adhesive strength of an interlayer film, it is preferred that the interlayer film contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the adipic acid ester, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

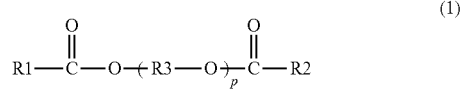

(1)

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate (3GO).

In the interlayer film, the content of the plasticizer (0) relative to 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of the laminated glass is further enhanced. When the content (0) is the above upper limit or less, the transparency of the interlayer film is further enhanced.

In the first layer, the content of the plasticizer (1) per 100 parts by weight of the thermoplastic resin (1) is defined as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of the laminated glass is further enhanced.

In the second layer, the content of the plasticizer (2) relative to 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of the laminated glass is further enhanced.

For the purpose of enhancing the sound insulating property of the laminated glass, it is preferred that the content (1) be larger than the content (2) and it is preferred that the content (1) be larger than the content (3).

From the viewpoint of further enhancing the sound insulating property of the laminated glass, each of the absolute value of difference between the content (2) and the content (1) and the absolute value of difference between the content (3) and the content (1) is preferably 10 parts by weight or more, more preferably 15 parts by weight or more, and further preferably parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Dispersing Agent)

It is preferred that the interlayer film contain a dispersing agent. The first layer may contain or need not contain a dispersing agent. The second layer may contain or need not contain a dispersing agent. The third layer may contain or need not contain a dispersing agent. It is preferred that a layer containing the pigment (a first layer, a second layer, or a third layer) contain a dispersing agent. By using the dispersing agent, it is possible to further enhance the dispersibility of the pigment, and thus it is possible to make bluish fogging still less likely to occur. One kind of the dispersing agent may be used alone and two or more kinds thereof may be used in combination.

Examples of the dispersing agent include a phosphoric acid ester (phosphoric acid ester-based dispersing agent), a diketone compound (diketone-based dispersing agent), a polyurethane compound (polyurethane-based dispersing agent), a carboxylic acid (carboxylic acid-based dispersing agent), an amine compound (amine-based dispersing agent), and a ricinoleic acid ester compound (ricinoleic acid ester-based dispersing agent) and the like.

Examples of the phosphoric acid ester include polyoxyalkylene alkylphenyl ether phosphoric acid esters such as polyoxyethylene nonylphenyl ether phosphoric acid ester, polyoxyethylene tridecyl ether phosphoric acid ester, and polyoxyethylene octylphenyl ether phosphoric acid ester; polyoxyethylene alkyl ether phosphoric acid ester, polyoxyethylene alkyl ether phosphoric acid ester monoethanolamine salt, polyoxyethylene lauryl ether phosphoric acid ester, polyoxyethylene lauryl ether phosphoric acid ester monoethanolamine salt, polyethylene styrenated phenyl ether phosphoric acid ester, sodium alkyl phosphoric acid ester, and alkyl phosphoric acid ester monoethanolamine salt, and the like. The phosphoric acid ester is preferably a phosphoric acid ester surfactant, more preferably a phosphoric acid ester anionic surfactant.

Examples of the diketone compound include acetyl acetone, diacetyl, benzoyl trifluoroacetone, and dipivaloyl-methane and the like.

Examples of the polyurethane compound include basic polyurethane-acryl, polyurethane-polyurea, polyurethane, polyester-polyurethane, polyether-polyurethane, and silicone polyurethane and the like.

Examples of the carboxylic acid include polycarboxylic acid and the like.

Examples of the amine compound include tetradecylamine acetate, laurylamine, oleylamine, distearylamine, dimethyl lauryl amine, and the like.

Examples of the ricinoleic acid ester compound include glycerin ricinoleic acid monoester, polyglycerin ricinoleic acid monoester, acetyl ricinoleic acid ester and the like.

From the viewpoint of further enhancing the dispersibility of the pigment, and making bluish fogging still less likely to occur, the dispersing agent preferably includes a phosphoric acid ester or a diketone compound, and preferably includes at least a phosphoric acid ester. From the viewpoint of further enhancing the dispersibility of the pigment, and making bluish fogging still less likely to occur, it is preferred that the dispersing agent include a dispersing agent other than a nonionic surfactant, and it is more preferred that the dispersing agent include an anionic surfactant. The interlayer film need not contain a nonionic surfactant.

In 100% by weight of the interlayer film or in 100% by weight of a layer containing the pigment (a first layer, a second layer, or a third layer), the content of the dispersing agent is preferably 0.000001% by weight or more, more preferably 0.00001% by weight or more, and is preferably 18 by weight or less, more preferably 0.18 by weight or less. When the content of the dispersing agent is the above-described lower limit or more and the above-described upper limit or less, it is possible to further enhance the dispersibility of the pigment, and thus it is possible to make bluish fogging still less likely to occur.

The content of the dispersing agent in a layer containing the pigment (a first layer, a second layer, or a third layer) per 100 parts by weight of the pigment in the layer containing the pigment (a first layer, a second layer, or a third layer) is preferably 0.000001 parts by weight or more, more preferably 0.00001 parts by weight or more, and is preferably 1 part by weight or less, more preferably 0.1 parts by weight or less. When the content of the dispersing agent is the above-described lower limit or more and the above-described upper limit or less, it is possible to further enhance the dispersibility of the pigment, and thus it is possible to make bluish fogging still less likely to occur.

(Adhesive Force Adjusting Agent)

It is preferred that the interlayer film contain an adhesive force adjusting agent. It is preferred that the first layer contain an adhesive force adjusting agent. It is preferred that the second layer contain an adhesive force adjusting agent. It is preferred that the third layer contain an adhesive force adjusting agent. By the use of the adhesive force adjusting agent, controlling the adhesivity between the interlayer film and a lamination glass member or the adhesivity between respective layers in the interlayer film is facilitated. By the use of the adhesive force adjusting agent, it is possible to enhance the penetration resistance of the laminated glass. One kind of the adhesive force adjusting agent may be used alone, and two or more kinds thereof may be used in combination.

Examples of the adhesive force adjusting agent include alkali metal salts and alkali earth metal salts and the like. The alkali earth metal means six metals of Be, Mg, Ca, Sr, Ba, and Ra.

It is preferred that the adhesive force adjusting agent be a metal salt containing at least one kind of metal selected from the group consisting of Li, Na, K, Rb, Cs, Mg, Ca, Sr and Ba. It is preferred that the metal salt contained in the interlayer film contain at least one kind of metal between K and Mg.

It is preferred that the adhesive force adjusting agent be an alkali metal salt of an organic acid having 2 to 16 carbon atoms, or an alkali earth metal salt of an organic acid having 2 to 16 carbon atoms. It is more preferred that the adhesive force adjusting agent be an alkali metal salt of carboxylic acid, or an alkali earth metal salt of carboxylic acid, and it is further preferred that the adhesive force adjusting agent be an alkali metal salt of carboxylic acid having 2 to 16 carbon atoms, or an alkali earth metal salt of carboxylic acid having 2 to 16 carbon atoms. It is especially preferred that the adhesive force adjusting agent be a magnesium salt of carboxylic acid having 2 to 16 carbon atoms, or a potassium salt of carboxylic acid having 2 to 16 carbon atoms. In this case, the adhesivity between the interlayer film and a lamination glass member or the adhesivity between layers in the interlayer film can be controlled further well, and the penetration resistance of the laminated glass can be further enhanced.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

In the interlayer film, or in a layer containing the adhesive force adjusting agent (a first layer, a second layer, or a third layer), the total of contents of Mg and K is preferably 5 ppm or more, more preferably 10 ppm or more, further preferably 20 ppm or more, and is preferably 300 ppm or less, more preferably 250 ppm or less, further preferably 200 ppm or less. When the total of contents of Mg and K is the above lower limit or more and the above upper limit or less, the adhesivity between the interlayer film and a lamination glass member or the adhesivity layers in the interlayer film can be controlled further well, and the penetration resistance of the laminated glass can be further enhanced.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. The ultraviolet ray screening agent may be or need not be a pigment. By the use of an ultraviolet ray screening agent, the visible light transmittance becomes still less likely to decrease even when the interlayer film and the laminated glass are used for a long period. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3', 5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3', 5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene) malonate, tetraethyl-2,2-(1,4-phenylenedimethylidene)bismalonate, and 2-(p-methoxybenzylidene)-bis (1,2,2,6,6-pentamethyl-4-piperidinyl) malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl) oxalic acid diamide, N-(2-ethylphenyl)-N'-(2-ethoxyphenyl) oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, the visible light transmittance becomes still less likely to decrease even when the interlayer film and the laminated glass are used for a long period. In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. Especially, by setting the content of the ultraviolet ray screening agent to be 0.2% by weight or more in 100% by weight of a layer containing the ultraviolet ray screening agent, the visible light transmittance becomes still less likely to decrease even when the interlayer film and the laminated glass are used for a long period.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. By using the oxidation inhibitor, it is possible to effectively prevent deterioration of the resin. By using the oxidation inhibitor, the visible light transmittance becomes still less likely to decrease. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor, and it is more preferred that the oxidation inhibitor be a phenol-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl ß-(3,5-di-t-butyl-4-hydroxyphenyl) propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis [methylene-3-(3', 5'-butyl-4-hydroxyphenyl) propionate]methane, 1,3,3-tris-(2-methyl-4-hydroxy-5-t-butylphenol) butane, 1,3,5-trimethyl-2,4,6-tris(3,5-di-t-butyl-4-hydroxybenzyl) benzene, bis(3,3'-t-butylphenol) butyric acid glycol ester, and bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl) pentaerithritol diphosphite, bis(decyl) pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

In order to maintain the high visible light transmittance of the interlayer film and the laminated glass over a long period of time, it is preferred that the content of the oxidation inhibitor be 0.1% by weight or more in 100% by weight of the interlayer film or in 100% by weight of a layer containing the oxidation inhibitor (a first layer, a second layer, or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of a layer containing the oxidation inhibitor.

(Other Ingredients)

Each of the interlayer film, the first layer, the second layer, and the third layer may contain other ingredient as necessary. Examples of other ingredients include additives such as a light stabilizer, a coupling agent, a surfactant, a fire retardant, an antistatic agent, a moisture-proofing agent, a fluorescent brightener, and an infrared absorber, and the like. One kind of these additives may be used alone, and two or more kinds thereof may be used in combination.

(Other Details of Interlayer Film for Laminated Glass)

The interlayer film has one end and the other end being on an opposite side of the one end. The one end and the other end are end parts of both sides facing each other in the interlayer film.

The interlayer film may be an interlayer film in which the thickness of the one end and the thickness of the other end are the same, or may be an interlayer film in which the thickness of the other end is larger than the thickness of the one end.

The maximum thickness of the interlayer film is preferably 0.1 mm or more, more preferably 0.25 mm or more, further preferably 0.5 mm or more, especially preferably 0.8 mm or more, and is preferably 3.8 mm or less, more preferably 2.0 mm or less, further preferably 1.5 mm or less.

From the viewpoint of the practical aspect and the viewpoint of sufficiently enhancing the adhesive strength and the penetration resistance, the maximum thickness of a surface layer is preferably 0.001 mm or more, more preferably 0.2 mm or more, further preferably 0.3 mm or more, and is preferably 1.0 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance between one end and the other end of the interlayer film is preferably 3.0 m or less, more preferably 2.0 m or less, especially preferably 1.5 m or less, and is preferably 0.5 m or more, more preferably 0.8 m or more, especially preferably 1.0 m or more.

The interlayer film may be wound to be formed into a roll body of the interlayer film. The roll body may include a winding core and an interlayer film wound on the outer periphery of the winding core.

The method for producing the interlayer film is not particularly limited.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method (melt fracture method), an emboss roll method, a calender roll method, and a profile extrusion method, and the like.

(Laminated Glass)

The laminated glass according to the present invention includes a first lamination glass member, a second lamination glass member, and an interlayer film for laminated glass. In the laminated glass according to the present invention, the above-mentioned interlayer film for laminated glass is arranged between the first lamination glass member and the second lamination glass member.

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface of the interlayer film 11. The second lamination glass member 22 is layered on a second surface opposite to the first surface of the interlayer film 11. The first lamination glass member 21 is layered on an outer surface of the second layer 2. The second lamination glass member 22 is layered on an outer surface of the third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface of the interlayer film 11A. The second lamination glass member 22 is layered on a second surface opposite to the first surface of the interlayer film 11.

In the laminated glass according to the present invention, it is preferred that the interlayer film for laminated glass contain a pigment. In the laminated glass according to the present invention, the interlayer film according to the present invention may be used.

In the laminated glass according to the present invention, it is preferred that a value YId obtained by subtracting a yellow index YIp calculated from parallel light transmittance from a yellow index YIt calculated from total light transmittance be −1.0 or more. It is preferred that the value YId be a value calculated by the formula: YId=YIt−YIp. In other words, it is preferred that the laminated glass according to the present invention satisfy the formula: YIt−YIp≥−1.0. It is preferred that the laminated glass according to the present invention satisfy the formula: YId≥−1.0.

In the laminated glass according to the present invention, since the above-described configuration is provided, it is possible to make bluish fogging less likely to occur. In the laminated glass according to the present invention, it is possible to make bluish fogging less likely to occur although the interlayer film contains a pigment.

The total light transmittance of the laminated glass according to the present invention is measured in the same manner as that for the total light transmittance of the laminated glass X. The parallel light transmittance of the laminated glass according to the present invention is measured in the same manner as that for the parallel light transmittance of the laminated glass X.

The value YId in the laminated glass according to the present invention is preferably −1.0 or more, more preferably −0.9 or more, still more preferably −0.8 or more, further preferably −0.7 or more, still further preferably −0.6 or more, especially preferably −0.5 or more, most preferably −0.4 or more. When the value YId is the above lower limit or more, it is possible to make bluish fogging still less likely to occur. The value YId may be 10.0 or less, may be 9.0 or less, and may be 8.0 or less.

The laminated glass may be a head-up display. When the laminated glass is a head-up display, the laminated glass has a display region of the head-up display. The display region is a region capable of favorably displaying information.

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of each of the first lamination glass member and the second lamination glass member is preferably 1 mm or more, and is preferably 5 mm or less, more preferably 3 mm or less. Moreover, when the lamination glass member is a glass plate, the thickness of the glass plate is preferably 0.5 mm or more, more preferably 0.7 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass for an automobile.

Hereinafter, the present invention will be described in more detail with reference to examples and comparative examples. The present invention is not limited only to these examples.

In polyvinyl acetal resins used, n-butyraldehyde that has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

The following materials were prepared.
(Pigment)
    ITO particles 1 (average particle diameter 26 nm, average aspect ratio 1.8)
    ITO particles 2 (average particle diameter 42 nm, average aspect ratio 2.2)
    ITO particles 3 (average particle diameter 26 nm, average aspect ratio 4.1)
    CWO particles 1 (average particle diameter 28 nm, average aspect ratio 2.9, $Cs_{0.33}WO_3$)
    Carbon black (average particle diameter 59 nm, average aspect ratio 1.9)
    Perylene (average particle diameter 37 nm, average aspect ratio 1.7)
    Quinacridone (average particle diameter 49 nm, average aspect ratio 2.4)

The average particle diameter and the average aspect ratio of each pigment were determined in the following manner.

A polyvinyl butyral resin (the polymerization degree of polyvinyl alcohol of 1700, the content of the hydroxyl group of 30% by mole, the acetylation degree of 1% by mole, the butyralization degree of 69% by mole) was prepared. One hundred parts by weight of the polyvinyl butyral resin, 40 parts by weight of triethylene glycol di-2-ethylhexanoate (3GO), and a pigment in a content of 0.015% by weight in 100% by weight of the total amount of the polyvinyl butyral resin, 3GO and the pigment were kneaded and extruded to give a resin film (single layer, resin film for evaluation) having a thickness of 760 μm. The obtained resin film was observed under a transmission electron microscopy (TEM) ("HT7700 model" available from Hitachi High-Tech Corporation) with a 5000-fold magnification. The micrograph was analyzed by image analyzing software ("Win ROOF" available from MITANI CORPORATION) to calculate an equivalent circle diameter and an aspect ratio of the pigment. By calculating the equivalent circle diameter and the aspect ratio of each of 50 random pigments extracted from the micrograph, and determining the mean values, an average particle diameter and an average aspect ratio of each pigment were determined.

(Thermoplastic Resin)
    Polyvinyl acetal resin 1 (polyvinyl butyral resin (PVB1), average polymerization degree of 1700, content of hydroxyl group of 30% by mole, acetylation degree of 1% by mole, acetalization degree (butyralization degree) of 69% by mole))
    Polyvinyl acetal resin 2 (polyvinyl butyral resin (PVB2), average polymerization degree of 3300, content of hydroxyl group of 25.0% by mole, acetylation degree of 12.5% by mole, acetalization degree (butyralization degree) of 62.5% by mole))

(Plasticizer)
    Triethylene glycol di-2-ethylhexanoate (3GO)

(Dispersing Agent)
    Phosphoric acid ester anionic surfactant ("PLYSURF 208B" available from DKS Co. Ltd.)
    Acetyl Acetone
    Nonionic surfactant ("PELETEX 2020" available from MIYOSHI OIL & FAT CO., LTD.)

(Adhesive Force Adjusting Agent)
    Mg mixture (50:50 (weight ratio) mixture of magnesium 2-ethylbutyrate and magnesium acetate)

(Oxidation Inhibitor)
    Phenolic oxidation inhibitor (2,6-di-t-butyl-p-cresol (BHT))

(Ultraviolet Ray Screening Agent)
    2-(2'-hydroxy-3'-t-butyl-5-methylphenyl)-5-chlorobenzotriazole ("Tinuvin 326" available from BASF Japan Ltd.)

Example 1

Preparation of Composition for Forming Interlayer Film:
    The following ingredients were mixed, and kneaded sufficiently with a mixing roll to obtain a composition for forming an interlayer film.
    Polyvinyl butyral resin (PVB1): 100 parts by weight
    Triethylene glycol di-2-ethylhexanoate (3GO): 40 parts by weight
    ITO particles 1 in an amount of 0.00170 g/cm³ in the obtained interlayer film
    Phosphoric acid ester anionic surfactant in an amount of 0.015% by weight in the obtained interlayer film
    Acetyl acetone in an amount of 0.066% by weight in the obtained interlayer film
    Adhesive force adjusting agent (Mg mixture) in such an amount that the content of magnesium in the obtained interlayer film is 65 ppm
    Oxidation inhibitor (BHT) in an amount of 0.2% by weight in the obtained interlayer film
    Ultraviolet ray screening agent (Tinuvin326) in an amount of 0.2% by weight in the obtained interlayer film Preparation of Interlayer Film:
    By extruding a composition for forming an interlayer film with an extruder, a single-layered interlayer film (thickness: 760 μm) having only the first layer was prepared.

Preparation of Laminated Glass:
    The obtained interlayer film was sandwiched between two sheets of clear glass (300 mm long×300 mm wide) of 2.5-mm thick conforming to JIS R3202:1996 to obtain a laminate. The obtained laminate was put into a rubber bag and the inside thereof is degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a laminated glass. The obtained laminated glass corresponds to the aforementioned laminated glass X.

Examples 2 to 12 and Comparative Examples 1 to 6

A single-layered interlayer film (thickness: 760 μm) and a laminated glass were prepared in the same manner as that in Example 1 except that the kinds and the contents of the ingredients were changed to those shown in Tables 1, 3, 5, 7, and 9. Regarding the oxidation inhibitor and the ultraviolet ray screening agent, the same kinds and the same blending amounts as those in Example 1 were used.

Example 13

Preparation of Composition for Forming First Layer:
The following ingredients were mixed, and kneaded sufficiently with a mixing roll to obtain a composition for forming a first layer.
Polyvinyl butyral resin (PVB2): 100 parts by weight
Triethylene glycol di-2-ethylhexanoate (3GO): 60 parts by weight
Oxidation inhibitor (BHT) in an amount of 0.2% by weight in the obtained first layer
Ultraviolet ray screening agent (Tinuvin326) in an amount of 0.2% by weight in the obtained first layer
Preparation of Composition for Forming Second Layer and Third Layer:
The following ingredients were mixed, and kneaded sufficiently with a mixing roll to obtain a composition for forming a second layer and a third layer.
Polyvinyl butyral resin (PVB1): 100 parts by weight
Triethylene glycol di-2-ethylhexanoate (3GO): 37.5 parts by weight
ITO particles 1 in an amount of 0.00170 g/cm$^3$ in the obtained second layer and third layer
Phosphoric acid ester anionic surfactant in an amount of 0.015% by weight in the obtained second layer and third layer
Acetyl acetone in an amount of 0.066% by weight in the obtained second layer and third layer
Adhesive force adjusting agent (Mg mixture) in such an amount that the content of magnesium in the obtained second layer and third layer is 65 ppm
Oxidation inhibitor (BHT) in an amount of 0.2% by weight in the obtained second layer and third layer
Ultraviolet ray screening agent (Tinuvin 326) in an amount of 0.2% by weight in the obtained second layer and third layer
Preparation of Interlayer Film:
By coextruding a composition for forming a first layer and a composition for forming second and third layers using a coextruder, a multilayer interlayer film (800 μm thick) having a three-layer structure (a second layer (350 μm thick)/a first layer (100 μm thick)/a third layer (350 μm thick)) was prepared.
Preparation of Laminated Glass:
Laminated glass was prepared in the same manner as that in Example 1 except that the obtained interlayer film was used.

(Evaluation)
(1) Yellow Index YIt, Yellow Index YIp, and Value YId
Measurement of Total Light Transmittance of Laminated Glass:
The obtained laminated glass was placed parallel with the normal line of the light axis on the optical path between the light source and the integrating sphere at a position where the laminated glass is in contact with the integrating sphere so that the transmitted light is received by the integrating sphere, and visible light transmittance was with measured a spectrophotometer ("U-4100" available from Hitachi High-Tech Corporation).
Measurement of Parallel Light Transmittance of Laminated Glass:
The obtained laminated glass was placed parallel with the normal line of the light axis on the optical path between the light source and the integrating sphere at a position 13 cm distanced from the integrating sphere so that only the transmitted parallel light is received by the integrating sphere, and visible light transmittance was measured with a spectrophotometer ("U-4100" available from Hitachi High-Tech Corporation).
Calculation of Yellow Index YIt, and Yellow Index YIp:
A yellow index YIt was calculated from total light transmittance, and a yellow index YIp was calculated from parallel light transmittance in accordance with JIS K7373.
Calculation of Value YId:
From the obtained yellow index YIt, the obtained yellow index YIp was subtracted to calculate a value YId (=YIt-YIp).
(2) Average Distance Between Neighboring Pigments
The obtained interlayer film was observed under a transmission electron microscopy (TEM) ("HT7700 model" available from Hitachi High-Tech Corporation). The micrograph was analyzed by image analyzing software, and surface-to-surface distances between neighboring pigments were measured, and the mean value of the distances was determined.
(3) Haze
A haze value of the obtained laminated glass was measured using a haze meter ("TC-HIIIDPK" available from Tokyo Denshoku Co., Ltd.) in accordance with JIS K6714.
(4) Penetration Resistance (Measurement of MBH)
For each obtained laminated glass, six sheets of laminated glass (300 mm long×300 mm wide) were prepared, and the surface temperature was adjusted to 23° C. Then, for each of six sheets of laminated glass, a rigid ball having a weight of 2260 g and a diameter of 82 mm was dropped from a height of 4 m to the center part of the laminated glass in accordance with JIS R3212. When the number of sheets of laminated glass through which the rigid ball failed to penetrate in 5 seconds after collision was 6, the laminated glass was determined as accepted, whereas when the number of sheets of laminated glass through which the rigid ball failed to penetrate in 5 seconds after collision was 3 or less, the laminated glass was determined as rejected. When the number of sheets of laminated glass through which the rigid ball failed to penetrate in 5 seconds after collision was 5, another one sheet of laminated glass was additionally tested, and if the rigid ball failed to penetrate in 5 seconds after collision, the laminated glass was determined as accepted, and if the rigid ball penetrated in 5 seconds after collision, the laminated glass was determined as rejected. When the number of sheets of laminated glass through which the rigid ball failed to penetrate in 5 seconds after collision was 4, other six sheets of laminated glass were subjected to a penetration resistance test, and the test was repeated until acceptance or rejection was determined. In Tables, the case of acceptance is indicated by "O", and the case of rejection is indicated by "x".

(5) Bluish Fogging

An obtained laminated glass (300 mm long×300 mm wide) was set on the front face of a lightproof box (300 mm long×300 mm wide×400 mm deep, inner wall face: black). An S-Light (available from NIPPON GIJUTSU CENTER Co., LTD.) was set at a position facing the front face of the lightproof box, and the laminated glass was irradiated with light. Under this condition, the laminated glass was visually observed from the position of diagonally 45 degrees relative to the principal plane of the laminated glass, and whether or not the background black was recognized was evaluated. In Tables, the case where the background black was recognized is indicated by "O" and the case where the background black was not recognized is indicated by "x". When the background black was not recognized, bluish fogging of the laminated glass was observed.

Configurations of interlayer films and results are shown in the following Tables 1 to 12.

TABLE 1

|  |  |  |  | Example 1 | Example 2 | Example 3 | Example 4 | Example 5 |
|---|---|---|---|---|---|---|---|---|
| Configuration of interlayer film | Thermoplastic resin | Kind | — | PVB1 | PVB1 | PVB1 | PVB1 | PVB1 |
| | | Blending amount | parts by weight | 100 | 100 | 100 | 100 | 100 |
| | Plasticizer | Kind | — | 3GO | 3GO | 3GO | 3GO | 3GO |
| | | Blending amount | parts by weight | 40 | 40 | 40 | 40 | 40 |
| | Pigment 1 | Kind | — | ITO particles 1 | ITO particles 1 | ITO particles 1 | ITO particles 1 | CWO particles 1 |
| | | Average particle diameter | nm | 26 | 26 | 26 | 26 | 28 |
| | | Average aspect ratio | — | 1.8 | 1.8 | 1.8 | 1.8 | 2.9 |
| | | Density in interlayer film | g/cm$^3$ | 0.00170 | 0.00255 | 0.00510 | 0.01021 | 0.00045 |
| | Pigment 2 | Kind | — | — | — | — | CWO particles 1 | — |
| | | Average particle diameter | nm | — | — | — | 28 | — |
| | | Average aspect ratio | — | — | — | — | 2.9 | — |
| | | Density in interlayer film | g/cm$^3$ | — | — | — | 0.00045 | — |
| | Dispersing agent 1 | Kind | — | Phosphoric acid ester anionic surfactant | Phosphoric acid ester anionic surfactant | Phosphoric acid ester anionic surfactant | Phosphoric acid ester anionic surfactant | Phosphoric acid ester anionic surfactant |
| | | Blending amount | % by weight | 0.015 | 0.022 | 0.045 | 0.089 | 0.004 |
| | Dispersing agent 2 | Kind | — | Acetyl acetone | Acetyl acetone | Acetyl acetone | Acetyl acetone | — |
| | | Blending amount | % by weight | 0.066 | 0.099 | 0.198 | 0.396 | — |
| | Adhesive force adjusting agent | Mg concentration | ppm | 65 | 75 | 90 | 90 | 65 |

TABLE 2

|  |  |  |  | Example 1 | Example 2 | Example 3 | Example 4 | Example 5 |
|---|---|---|---|---|---|---|---|---|
| Evaluation | Measurement of total light transmittance | Visible light transmittance | % | 87.7 | 87.3 | 86.3 | 76.2 | 84.1 |
| | | YIt | — | 2.7 | 2.9 | 3.3 | 3.8 | 0.5 |
| | Measurement of parallel light transmittance | Visible light transmittance | % | 87.6 | 87.2 | 86.1 | 76.1 | 84.0 |
| | | YIp | — | 3.0 | 3.2 | 4.0 | 4.7 | 0.7 |
| | Diffuse transmittance | Visible light transmittance | % | 0.1 | 0.1 | 0.2 | 0.1 | 0.1 |
| | | YId | — | −0.3 | −0.4 | −0.7 | −1.0 | −0.2 |
| | Average distance between neighboring pigments | | μm | 0.3 | 0.2 | 0.1 | 0.8 | 1.0 |
| | Haze | | % | 0.2 | 0.3 | 0.3 | 0.4 | 0.2 |
| | Penetration resistance | | MBH | ○ | ○ | ○ | ○ | ○ |
| | Bluish fogging | | — | ○ | ○ | ○ | ○ | ○ |

TABLE 3

| | | | | Example 6 | Example 7 | Example 8 | Example 9 |
|---|---|---|---|---|---|---|---|
| Configuration of interlayer film | Thermoplastic resin | Kind | — | PVB1 | PVB1 | PVB1 | PVB1 |
| | | Blending amount | parts by weight | 100 | 100 | 100 | 100 |
| | Plasticizer | Kind | — | 3GO | 3GO | 3GO | 3GO |
| | | Blending amount | parts by weight | 40 | 40 | 40 | 40 |
| | Pigment 1 | Kind | — | CWO particles 1 | CWO particles 1 | ITO particles 1 | ITO particles 1 |
| | | Average particle diameter | nm | 28 | 28 | 26 | 26 |
| | | Average aspect ratio | — | 2.9 | 2.9 | 1.8 | 1.8 |
| | | Density in interlayer film | g/cm$^3$ | 0.00068 | 0.00091 | 0.00255 | 0.00510 |
| | Pigment 2 | Kind | — | — | — | CWO particles 1 | CWO particles 1 |
| | | Average particle diameter | nm | — | — | 28 | 28 |
| | | Average aspect ratio | — | — | — | 2.9 | 2.9 |
| | | Density in interlayer film | g/cm$^3$ | — | — | 0.00011 | 0.00023 |
| | Dispersing agent 1 | Kind | — | Phosphoric acid ester anionic surfactant | Phosphoric acid ester anionic surfactant | Phosphoric acid ester anionic surfactant | Phosphoric acid ester anionic surfactant |
| | | Blending amount | % by weight | 0.006 | 0.008 | 0.022 | 0.045 |
| | Dispersing agent 2 | Kind | — | — | — | Acetyl acetone | Acetyl acetone |
| | | Blending amount | % by weight | — | — | 0.099 | 0.198 |
| | Adhesive force adjusting agent | Mg concentration | ppm | 65 | 65 | 80 | 100 |

TABLE 4

| | | | | Example 6 | Example 7 | Example 8 | Example 9 |
|---|---|---|---|---|---|---|---|
| Evaluation | Measurement of total light transmittance | Visible light transmittance | % | 82 | 80.2 | 85.6 | 82.5 |
| | | YIt | — | −0.5 | −1.5 | 2.4 | 2.2 |
| | Measurement of parallel light transmittance | Visible light transmittance | % | 81.9 | 79.9 | 85.4 | 82.3 |
| | | YIp | — | −0.2 | −1.1 | 2.7 | 2.8 |
| | Diffuse transmittance | Visible light transmittance | % | 0.1 | 0.3 | 0.1 | 0.2 |
| | | YId | — | −0.3 | −0.4 | −0.4 | −0.5 |
| | Average distance between neighboring pigments | | μm | 0.7 | 0.5 | 0.2 | 0.2 |
| | Haze | | % | 0.3 | 0.4 | 0.3 | 0.4 |
| | Penetration resistance | MBH | — | ○ | ○ | ○ | ○ |
| | Bluish fogging | | — | ○ | ○ | ○ | ○ |

TABLE 5

| | | | | Example 10 | Example 11 | Example 12 |
|---|---|---|---|---|---|---|
| Configuration of interlayer film | Thermoplastic resin | Kind | — | PVB1 | PVB1 | PVB1 |
| | | Blending amount | parts by weight | 100 | 100 | 100 |
| | Plasticizer | Kind | — | 3GO | 3GO | 3GO |
| | | Blending amount | parts by weight | 40 | 40 | 40 |
| | Pigment 1 | Kind | — | Carbon black | Perylene | Quinacridone |
| | | Average particle diameter | nm | 59 | 37 | 49 |
| | | Average aspect ratio | — | 1.9 | 1.7 | 2.4 |
| | | Density in interlayer film | g/cm$^3$ | 0.00037 | 0.00009 | 0.00011 |
| | Pigment 2 | Kind | — | — | — | — |
| | | Average particle diameter | nm | — | — | — |

TABLE 5-continued

|  |  |  | Example 10 | Example 11 | Example 12 |
|---|---|---|---|---|---|
|  | Average aspect ratio |  | — | — | — |
|  | Density in interlayer film | g/cm³ | — | — | — |
| Dispersing agent 1 | Kind | — | Phosphoric acid ester anionic surfactant | Phosphoric acid ester anionic surfactant | Phosphoric acid ester anionic surfactant |
|  | Blending amount | % by weight | 0.003 | 0.001 | 0.001 |
| Dispersing agent 2 | Kind | — | — | — | — |
|  | Blending amount | % by weight | — | — | — |
| Adhesive force adjusting agent | Mg concentration | ppm | 60 | 60 | 60 |

TABLE 6

|  |  |  |  | Example 10 | Example 11 | Example 12 |
|---|---|---|---|---|---|---|
| Evaluation | Measurement of total light transmittance | Visible light transmittance | % | 9.4 | 68.2 | 76.9 |
|  |  | YIt | — | 62.8 | 36.0 | −6.3 |
|  | Measurement of parallel light transmittance | Visible light transmittance | % | 9.3 | 67.3 | 76.5 |
|  |  | YIp | — | 63.5 | 36.4 | −6.2 |
|  | Diffuse transmittance | Visible light transmittance | % | 0.1 | 0.9 | 0.4 |
|  |  | YId | — | −0.6 | −0.4 | −0.1 |
|  | Average distance between neighboring pigments | | μm | 0.3 | 0.4 | 0.6 |
|  | Haze |  | % | 1.2 | 0.8 | 0.9 |
|  | Penetration resistance | MBH | — | ○ | ○ | ○ |
|  | Bluish fogging |  | — | ○ | ○ | ○ |

TABLE 7

|  |  |  |  | Comparative Example 1 | Comparative Example 2 | Comparative Example 3 | Comparative Example 4 |
|---|---|---|---|---|---|---|---|
| Configuration of interlayer film | Thermoplastic resin | Kind | — | PVB1 | PVB1 | PVB1 | PVB1 |
|  |  | Blending amount | parts by weight | 100 | 100 | 100 | 100 |
|  | Plasticizer | Kind | — | 3GO | 3GO | 3GO | 3GO |
|  |  | Blending amount | parts by weight | 40 | 40 | 40 | 40 |
|  | Pigment 1 | Kind | — | ITO particles 1 | ITO particles 1 | ITO particles 1 | ITO particles 2 |
|  |  | Average particle diameter | nm | 26 | 26 | 26 | 42 |
|  |  | Average aspect ratio | — | 1.8 | 1.8 | 1.8 | 2.2 |
|  |  | Density in interlayer film | g/cm³ | 0.00170 | 0.00510 | 0.01361 | 0.00510 |
|  | Pigment 2 | Kind | — | — | — | — | — |
|  |  | Average particle diameter | nm | — | — | — | — |
|  |  | Average aspect ratio | — | — | — | — | — |
|  |  | Density in interlayer film | g/cm³ | — | — | — | — |
|  | Dispersing agent 1 | Kind | — | — | — | Phosphoric acid ester anionic surfactant | Phosphoric acid ester anionic surfactant |
|  |  | Blending amount | % by weight | — | — | 0.119 | 0.045 |
|  | Dispersing agent 2 | Kind | — | Acetyl acetone | Acetyl acetone | Acetyl acetone | Acetyl acetone |
|  |  | Blending amount | % by weight | 0.066 | 0.198 | 0.528 | 0.198 |
|  | Adhesive force adjusting agent | Mg concentration | ppm | 0 | 75 | 120 | 90 |

TABLE 8

| | | | | Comparative Example 1 | Comparative Example 2 | Comparative Example 3 | Comparative Example 4 |
|---|---|---|---|---|---|---|---|
| Evaluation | Measurement of total light transmittance | Visible light transmittance | % | 87.6 | 86.1 | 82.6 | 85.9 |
| | | YIt | — | 2.1 | 2.5 | 4.8 | 3.1 |
| | Measurement of parallel light transmittance | Visible light transmittance | % | 87.1 | 85.2 | 82.4 | 85.4 |
| | | YIp | — | 3.3 | 4.1 | 6.5 | 4.5 |
| | Diffuse transmittance | Visible light transmittance | % | 0.5 | 0.9 | 0.3 | 0.5 |
| | | YId | — | −1.2 | −1.6 | −1.6 | −1.4 |
| | Average distance between neighboring pigments | | μm | 0.1 | 0.05 | 0.08 | 0.06 |
| | Haze | | % | 0.5 | 0.7 | 0.7 | 0.5 |
| | Penetration resistance | MBH | — | ○ | ○ | ○ | ○ |
| | Bluish fogging | | — | x | x | x | x |

TABLE 9

| | | | | Comparative Example 5 | Comparative Example 6 |
|---|---|---|---|---|---|
| Configuration of interlayer film | Thermoplastic resin | Kind | — | PVB1 | PVB1 |
| | | Blending amount | parts by weight | 100 | 100 |
| | Plasticizer | Kind | — | 3GO | 3GO |
| | | Blending amount | parts by weight | 40 | 40 |
| | Pigment 1 | Kind | — | ITO particles 3 | ITO particles 1 |
| | | Average particle diameter | nm | 26 | 26 |
| | | Average aspect ratio | — | 4.1 | 1.8 |
| | | Density in interlayer film | g/cm³ | 0.00510 | 0.00510 |
| | Pigment 2 | Kind | — | — | — |
| | | Average particle diameter | nm | — | — |
| | | Average aspect ratio | — | — | — |
| | | Density in interlayer film | g/cm³ | — | — |
| | Dispersing agent 1 | Kind | — | Phosphoric acid ester anionic surfactant | Nonionic surfactant |
| | | Blending amount | % by weight | 0.045 | 0.045 |
| | Dispersing agent 2 | Kind | — | Acetyl acetone | Acetyl acetone |
| | | Blending amount | % by weight | 0.198 | 0.198 |
| | Adhesive force adjusting agent | Mg concentration | ppm | 90 | 90 |

TABLE 10

| | | | | Comparative Example 5 | Comparative Example 6 |
|---|---|---|---|---|---|
| Evaluation | Measurement of total light transmittance | Visible light transmittance | % | 86.1 | 86.2 |
| | | YIt | — | 3.2 | 2.4 |
| | Measurement of parallel light transmittance | Visible light transmittance | % | 85.8 | 85.2 |
| | | YIp | — | 4.5 | 3.7 |
| | Diffuse transmittance | Visible light transmittance | % | 0.3 | 1.0 |
| | | YId | — | −1.3 | −1.3 |
| | Average distance between neighboring pigments | | μm | 0.09 | 0.08 |
| | Haze | | % | 0.7 | 0.7 |
| | Penetration resistance | MBH | — | ○ | x |
| | Bluish fogging | | — | x | x |

TABLE 11

| | | | | Example 13 |
|---|---|---|---|---|
| Configuration of interlayer film | Second layer | Thermoplastic resin | Kind | PVB1 |
| | | | Blending amount parts by weight | 100 |
| | | Plasticizer | Kind | 3GO |
| | | | Blending amount parts by weight | 37.5 |
| | | Pigment 1 | Kind | ITO particles 1 |
| | | | Average particle diameter nm | 26 |
| | | | Average aspect ratio | 1.8 |
| | | | Density in interlayer film g/cm³ | 0.00170 |
| | | Pigment 2 | Kind | — |
| | | | Average particle diameter nm | — |
| | | | Average aspect ratio | — |
| | | | Density in interlayer film g/cm³ | — |
| | | Dispersing agent 1 | Kind | Phosphoric acid ester anionic surfactant |
| | | | Blending amount % by weight | 0.015 |
| | | Dispersing agent 2 | Kind | Acetyl acetone |
| | | | Blending amount % by weight | 0.066 |
| | | Adhesive force adjusting agent | Mg concentration ppm | 65 |
| | First layer | Thermoplastic resin | Kind | PVB2 |
| | | | Blending amount parts by weight | 100 |
| | | Plasticizer | Kind | 3GO |
| | | | Blending amount parts by weight | 60 |
| | | Pigment 1 | Kind | — |
| | | | Average particle diameter nm | — |
| | | | Average aspect ratio | — |
| | | | Density in interlayer film g/cm³ | — |
| | | Pigment 2 | Kind | — |
| | | | Average particle diameter nm | — |
| | | | Average aspect ratio | — |
| | | | Density in interlayer film g/cm³ | — |
| | | Dispersing agent 1 | Kind | — |
| | | | Blending amount % by weight | — |
| | | Dispersing agent 2 | Kind | — |
| | | | Blending amount % by weight | — |
| | | Adhesive force adjusting agent | Mg concentration ppm | — |
| | Third layer | Thermoplastic resin | Kind | PVB1 |
| | | | Blending amount parts by weight | 100 |
| | | Plasticizer | Kind | 3GO |
| | | | Blending amount parts by weight | 37.5 |
| | | Pigment 1 | Kind | ITO particles 1 |
| | | | Average particle diameter nm | 26 |
| | | | Average aspect ratio | 1.8 |
| | | | Density in interlayer film g/cm³ | 0.00170 |
| | | Pigment 2 | Kind | — |
| | | | Average particle diameter nm | — |
| | | | Average aspect ratio | — |
| | | | Density in interlayer film g/cm³ | — |
| | | Dispersing agent 1 | Kind | Phosphoric acid ester anionic surfactant |
| | | | Blending amount % by weight | 0.015 |
| | | Dispersing agent 2 | Kind | Acetyl acetone |
| | | | Blending amount % by weight | 0.066 |
| | | Adhesive force adjusting agent | Mg concentration ppm | 65 |

TABLE 12

|  |  |  |  | Example 13 |
|---|---|---|---|---|
| Evaluation | Measurement of total light transmittance | Visible light transmittance | % | 87.8 |
|  |  | YIt | — | 2.7 |
|  | Measurement of parallel light transmittance | Visible light transmittance | % | 87.7 |
|  |  | YIp | — | 3.0 |
|  | Diffuse transmittance | Visible light transmittance | % | 0.1 |
|  |  | YId | — | −0.3 |
|  | Average distance between neighboring pigments |  | μm | 0.3 |
|  |  | Haze | % | 0.2 |
|  | Penetration resistance | MBH | — | ○ |
|  |  | Bluish fogging | — | ○ |

EXPLANATION OF SYMBOLS

1: First layer
1a: First surface
1b: Second surface
2: Second layer
3: Third layer
11, 11A: Interlayer film
21: First lamination glass member
22: Second lamination glass member
31, 31A: Laminated glass

The invention claimed is:

1. An interlayer film for laminated glass, comprising a pigment,
in the interlayer film for laminated glass, a value YId obtained by subtracting a yellow index YIp calculated from parallel light transmittance from a yellow index YIt calculated from total light transmittance being −1.0 or more.

2. The interlayer film for laminated glass according to claim 1, wherein the pigment has an average aspect ratio of 4.0 or less.

3. The interlayer film for laminated glass according to claim 1, wherein the pigment is a heat shielding pigment.

4. The interlayer film for laminated glass according to claim 1, wherein the pigment is an inorganic pigment.

5. The interlayer film for laminated glass according to claim 4, wherein the inorganic pigment is tin-doped indium oxide particles or cesium-doped tungsten oxide particles.

6. The interlayer film for laminated glass according to claim 1, wherein the pigment is a coloring pigment.

7. The interlayer film for laminated glass according to claim 6, wherein the coloring pigment is an azo compound, a condensed polycyclic compound, carbon black, or graphene.

8. The interlayer film for laminated glass according to claim 1, comprising a thermoplastic resin.

9. The interlayer film for laminated glass according to claim 1, comprising a dispersing agent.

10. The interlayer film for laminated glass according to claim 9, wherein the dispersing agent includes a phosphoric acid ester or a diketone compound.

11. The interlayer film for laminated glass according to claim 1, comprising an adhesive force adjusting agent.

12. The interlayer film for laminated glass according to claim 11, wherein the adhesive force adjusting agent is an alkali metal salt of carboxylic acid, or an alkali earth metal salt of carboxylic acid.

13. A laminated glass comprising:
a first lamination glass member;
a second lamination glass member; and
the interlayer film for laminated glass according to claim 1,
the interlayer film for laminated glass being arranged between the first lamination glass member and the second lamination glass member.

14. A laminated glass comprising:
a first lamination glass member;
a second lamination glass member; and
an interlayer film for laminated glass,
the interlayer film for laminated glass being arranged between the first lamination glass member and the second lamination glass member,
the interlayer film for laminated glass containing a pigment,
in the laminated glass, a value YId obtained by subtracting a yellow index YIp calculated from parallel light transmittance from a yellow index YIt calculated from total light transmittance being −1.0 or more.

15. The interlayer film for laminated glass according to claim 1, being an interlayer film having a one-layer structure or an interlayer film having a two or more-layer structure,
wherein the interlayer film having the two or more-layer structure includes a first layer and a second layer arranged on a first surface side of the first layer,
the first layer contains a polyvinyl acetal resin, and
the second layer contains a polyvinyl acetal resin.

16. The interlayer film for laminated glass according to claim 15, having the one-layer structure.

17. The interlayer film for laminated glass according to claim 15, having the two or more-layer structure.

18. The interlayer film for laminated glass according to claim 1, being an interlayer film having a one-layer structure or an interlayer film having a three or more-layer structure,
wherein the interlayer film having the three or more-layer structure includes a first layer, a second layer arranged on a first surface side of the first layer and a third layer arranged on a second surface side opposite to the first surface of the first layer,
the first layer contains a polyvinyl acetal resin,
the second layer contains a polyvinyl acetal resin, and
the third layer contains a polyvinyl acetal resin.

19. The interlayer film for laminated glass according to claim 1, comprising a dispersing agent.

* * * * *